US011363209B1

(12) United States Patent
Gajjala et al.

(10) Patent No.: US 11,363,209 B1
(45) Date of Patent: Jun. 14, 2022

(54) SYSTEMS AND METHODS FOR CAMERA ZOOM

(71) Applicant: QUALCOMM Incorporated, San Diego, CA (US)

(72) Inventors: Durga Prasad Reddy Gajjala, Hyderabad (IN); Narendra Kumar Chepuri, Cuddapah (IN); Nitin Srivastava, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/184,343

(22) Filed: Feb. 24, 2021

(51) Int. Cl.
*H04N 5/262* (2006.01)
*H04N 5/232* (2006.01)
*G06T 7/00* (2017.01)
*G06V 40/16* (2022.01)

(52) U.S. Cl.
CPC ....... *H04N 5/23296* (2013.01); *G06T 7/0002* (2013.01); *G06V 40/161* (2022.01); *H04N 5/23293* (2013.01); *G06T 2207/20104* (2013.01); *G06T 2207/30168* (2013.01); *G06T 2207/30201* (2013.01)

(58) Field of Classification Search
CPC ............ H04N 5/23296; H04N 5/23293; G06T 7/0002; G06T 2207/20104; G06T 2207/30168; G06T 2207/30201; G06V 40/161
USPC ...................................................... 348/240.2
See application file for complete search history.

(56) References Cited

U.S. PATENT DOCUMENTS

| 8,531,557 | B2 | 9/2013 | Wan et al. |
| 2013/0057731 | A1 | 3/2013 | Rodriguez et al. |
| 2013/0162868 | A1 | 6/2013 | Watanabe |
| 2016/0248984 | A1 | 8/2016 | Li et al. |
| 2016/0381282 | A1 | 12/2016 | Bandlamudi et al. |
| 2020/0204735 | A1 | 6/2020 | Khandelwal et al. |

OTHER PUBLICATIONS

Co-Pending U.S. Appl. No. 17/239,300, inventor MAO; Songan, filed Apr. 23, 2021.

*Primary Examiner* — Stephen P Coleman
(74) *Attorney, Agent, or Firm* — Qualcomm Incorporated

(57) ABSTRACT

Examples are described of digital zoom retaining image characteristics such as sharpness, clarity, and/or contrast. In some aspects, a device can receive an image and can determine various image characteristic scores corresponding to digitally zoomed variants of the image having different zoom strengths. For instance, the device can determine a first image characteristic score for a first zoom strength and a second image characteristic score for a second zoom strength. The device can compare the image characteristic scores to an image characteristic threshold, and can select the highest zoom strength for which the corresponding image characteristic score is not below the image characteristic threshold. For example, the device can select the first zoom strength if the first image characteristic score meets or exceeds the image characteristic threshold while the second image characteristic score does not. The device can output image data corresponding to the image at the selected zoom strength.

30 Claims, 10 Drawing Sheets

SYSTEMS AND METHODS FOR CAMERA ZOOM

FIELD

This application is related to image processing. More specifically, aspects of this application relate to systems and methods of identifying a high strength or high level of digital zoom for an image for which the image retains at least a threshold level of an one or more image characteristics, such as sharpness, contrast, or clarity.

BACKGROUND

In optics, zoom refers techniques that allow a camera to capture images that appear to be captured from closer to a photographed object or farther from the photographed object, depending on a zoom setting. Zooming in refers to an adjustment that makes captured images appear to be captured from closer to a photographed object. Zooming out refers to an adjustment that makes captured images appear to be captured from farther from a photographed object. Zoom includes optical zoom and digital zoom. Optical zoom produces clear images, but involves physical movement of one or more lenses of the camera. Digital zoom traditionally involves cropping and upscaling a portion of a captured image. Digital zoom does not require any specialized camera equipment. However, digitally zooming an image at a high zoom strength can negatively affect image characteristics such as sharpness, contrast, and/or clarity for the digitally zoomed portion of the image compared to the corresponding image characteristics of the original image.

SUMMARY

Systems and techniques are described herein for digital zoom. In some aspects, a device can receive an image captured by an image sensor. The device can determine various image characteristic scores corresponding to digitally zoomed versions of the image having different zoom strengths (also referred to as zoom levels). For instance, the device can determine a first image characteristic score for a first zoom strength (or zoom level) and a second image characteristic score for a second zoom strength (or zoom level). The device can compare the image characteristic scores to an image characteristic threshold, and can select the highest zoom strength for which the corresponding image characteristic score is not below the image characteristic threshold. In some examples, the device can select the highest zoom strength for which the corresponding image characteristic score is above the image characteristic threshold. In some examples, the device can select the highest zoom strength for which the corresponding image characteristic score is equal to the image characteristic threshold. For instance, the device can select the first zoom strength if the first image characteristic score meets or exceeds the image characteristic threshold and the second image characteristic score falls below the image characteristic threshold. The device can output image data (e.g., display the image data, store the image data, send the image data to another device, etc.) corresponding to a digitally zoomed portion of the image at the selected zoom strength.

In one example, an apparatus for image processing is provided. The apparatus includes a memory and one or more processors (e.g., implemented in circuitry) coupled to the memory. The one or more processors are configured to and can: receive an image from an image sensor; determine a first image characteristic score of a first set of image data, the first set of image data corresponding to a first zoomed variant of the image at a first zoom strength; determine a second image characteristic score of a second set of image data, the second set of image data corresponding to a second zoomed variant of the image at a second zoom strength; identify that the second image characteristic score is less than an image characteristic threshold; and output, as an output image, the first set of image data based on identifying that the second image characteristic score is less than the image characteristic threshold.

In another example, a method of image processing is provided. The method includes receiving an image captured by an image sensor. The method includes receiving an image from an image sensor; determining a first image characteristic score of a first set of image data, the first set of image data corresponding to a first zoomed variant of the image at a first zoom strength; determining a second image characteristic score of a second set of image data, the second set of image data corresponding to a second zoomed variant of the image at a second zoom strength; identifying that the second image characteristic score is less than an image characteristic threshold; and outputting, as an output image, the first set of image data based on identifying that the second image characteristic score is less than the image characteristic threshold.

In another example, a non-transitory computer-readable medium is provided that has stored thereon instructions that, when executed by one or more processors, cause the one or more processors to: receive an image from an image sensor; determine a first image characteristic score of a first set of image data, the first set of image data corresponding to a first zoomed variant of the image at a first zoom strength; determine a second image characteristic score of a second set of image data, the second set of image data corresponding to a second zoomed variant of the image at a second zoom strength; identify that the second image characteristic score is less than an image characteristic threshold; and output, as an output image, the first set of image data based on identifying that the second image characteristic score is less than the image characteristic threshold.

In another example, an apparatus for image processing is provided. The apparatus includes means for receiving an image from an image sensor; means for determining a first image characteristic score of a first set of image data, the first set of image data corresponding to a first zoomed variant of the image at a first zoom strength; means for determining a second image characteristic score of a second set of image data, the second set of image data corresponding to a second zoomed variant of the image at a second zoom strength; means for identifying that the second image characteristic score is less than an image characteristic threshold; and means for outputting, as an output image, the first set of image data based on identifying that the second image characteristic score is less than the image characteristic threshold.

In some aspects, outputting the first set of image data as the output image is also based on the first image characteristic score being greater than or equal to the image characteristic threshold.

In some aspects, the first image characteristic score is a first image sharpness score, the second image characteristic score is a second image sharpness score, and the image characteristic threshold is an image sharpness threshold. In some aspects, the first image characteristic score is a first under-sharpening value of the first set of image data, the second image characteristic score is a second under-sharpening value of the second set of image data, and the image characteristic threshold is an under-sharpening value threshold.

In some aspects, the methods, apparatuses, and computer-readable medium described above further comprise: receiving one or more inputs identifying a portion of the image, wherein the first zoomed variant of the image and the second zoomed variant of the image are based on the identified portion of the image. In some aspects, the first zoomed variant of the image and the second zoomed variant of the image include the identified portion of the image. In some aspects, the one or more inputs include a user input through a user interface. In some aspects, the one or more inputs include at least one of a touch input, a hover input, a gesture input, and a gaze input. In some aspects, the methods, apparatuses, and computer-readable medium described above further comprise: receiving the one or more inputs from an object detection algorithm, the object detection algorithm determining that the identified portion of the image includes a depiction of a type of object. In some aspects, the type of object is a face.

In some aspects, the methods, apparatuses, and computer-readable medium described above further comprise: generating the first zoomed variant of the image at least in part by cropping and upscaling the image according to the first zoom strength; and generating the second zoomed variant of the image at least in part by cropping and upscaling at least one of the image and the first zoomed variant of the image according to the second zoom strength.

In some aspects, to output the first set of image data as the output image, the one or more processors are configured to render the output image for display on a display screen. In some aspects, the apparatuses described above further comprise: the display screen configured to display the output image.

In some aspects, the methods, apparatuses, and computer-readable medium described above further comprise: identifying that a difference between the first image characteristic score and the second image characteristic score is less than a difference threshold; and outputting, as a second output image, the second set of image data based on the difference being less than the difference threshold.

In some aspects, the first set of image data corresponds to a first digitally zoomed portion of the image at the first zoom strength and the second set of image data corresponds to a second digitally zoomed portion of the image at the second zoom strength. In some aspects, the second digitally zoomed portion of the image is a subset of the first digitally zoomed portion of the image. In some aspects, the first digitally zoomed portion of the image is different from the second digitally zoomed portion of the image.

In some aspects, to output the first set of image data as the output image, the one or more processors are configured to transmit the output image using a communication interface. In some aspects, the apparatuses described above further comprise: the communication interface configured to transmit the output image to a device.

In some aspects, apparatuses described above are one of a mobile device, a mobile handset, a wireless communication device, a head-mounted display, and a camera. In some aspects, the apparatuses described above further comprise: the image sensor configured to capture the image.

In some aspects, the apparatus comprises a camera, a mobile device, a mobile telephone, a smart phone, a mobile handset, a portable gaming device, a wireless communication device, a smart watch, a wearable device, a head-mounted display (HMD), an extended reality device (e.g., a virtual reality (VR) device, an augmented reality (AR) device, or a mixed reality (MR) device), a personal computer, a laptop computer, a server computer, or other device. In some aspects, the one or more processors include an image signal processor (ISP). In some aspects, the apparatus includes a camera or multiple cameras for capturing one or more images. In some aspects, the apparatus includes an image sensor that captures the image. In some aspects, the apparatus further includes a display for displaying the image, one or more notifications (e.g., associated with processing of the image), and/or other displayable data. In some aspects, the display displays the image after the one or more processors process the image.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following figures.

DETAILED DESCRIPTION

Figure 1:
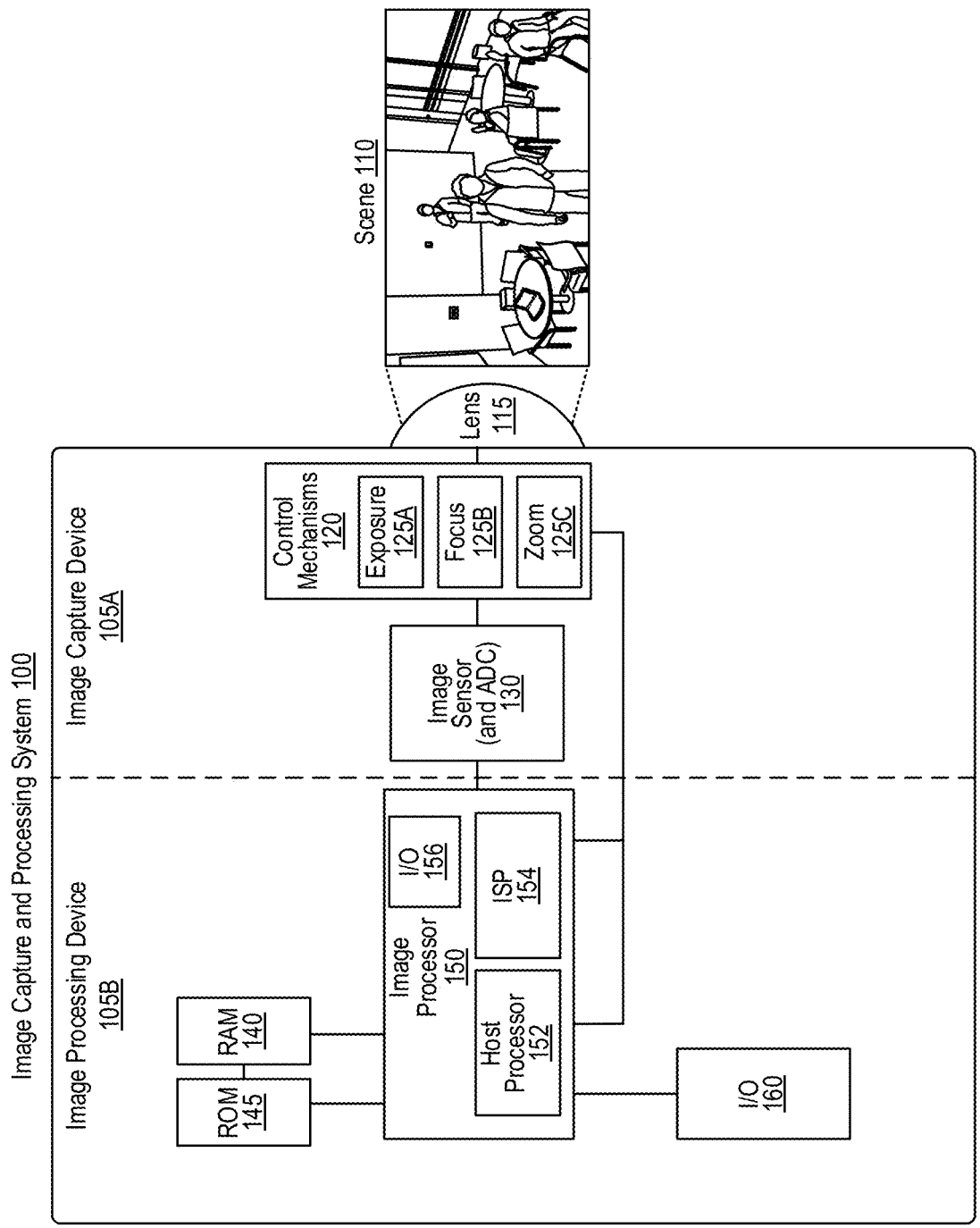
FIG. 1 is a block diagram illustrating an architecture of an image capture and processing system.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

An image capture device (e.g., a camera) is a device that receives light and captures image frames, such as still images or video frames, using an image sensor. The terms "image," "image frame," and "frame" are used interchangeably herein. An image capture device typically includes at least one lens that receives light from a scene and bends the light toward an image sensor of the image capture device. The light received by the lens passes through an aperture controlled by one or more control mechanisms and is received by the image sensor. The one or more control mechanisms can control exposure, focus, and/or zoom based on information from the image sensor and/or based on information from an image processor (e.g., a host or application process and/or an image signal processor). In some examples, the one or more control mechanisms include a motor or other control mechanism that moves a lens of an image capture device to a target lens position.

Zoom refers to a set of techniques that allow a camera to capture images that appear to be captured from closer to a photographed object or farther from the photographed object, depending on a zoom setting. Zooming in refers to an adjustment that makes captured images appear to be captured from closer to a photographed object. Zooming out refers to an adjustment that makes captured images appear to be captured from farther from a photographed object. Zoom includes optical zoom and digital zoom.

Optical zoom is a technique that performs zoom by changing the focal length of a zoom lens of the camera, or by switching from a camera with a first focal length to a camera with a second focal length. Zooming in through optical zoom does not degrade image quality, but requires specialized camera equipment and must be performed before the image is captured.

Digital zoom is a technique for zooming in on a portion of an image by cropping the image and upscaling the cropped image. Digital zoom can be beneficial because digital zoom does not require any specialized camera equipment, such as telephoto lenses, and can thus enable zoom functionality on devices with fairly basic cameras. Digital zoom can also be used in addition to optical zoom, to zoom in beyond a particular camera's optical zoom capabilities. Digital zoom can be performed at any point after the image is captured. However, zooming in using digital zoom involves cropping a portion of the original image and upscaling it. The process of zooming in can degrade image characteristics such as sharpness, contrast, and/or clarity. For instance, the cropped and upscaled portion of the image can have a lower image characteristic score (e.g., lower sharpness, lower contrast, and/or lower clarity) than the original image. For example, the degradation in quality brought about by digital zoom often reduces the sharpness of edges (e.g., making the edges appear blurry) and/or reduces the smoothness of curves (e.g., making the curves appear to have jagged edges).

As described in more detail below, systems and techniques are described herein for determining an selected digital zoom level that retains at least a threshold level of one or more image characteristics such as such as sharpness, contrast, and/or clarity. For instance, an image sensor (e.g., a camera or portion of a camera) of a device may capture an image. An input may be received at the device that identifies a portion of the image. For instance, the device can receive the input while a display screen of the device displays the image. In some examples, the input can be a touch input touching the portion of the image as displayed on the display screen, for instance where the display screen is a touchscreen. The input can be a hover input, a gaze tracking input, a mouse cursor click input, a pointer click input, a button press input, any combination thereof, and/or another type of input identifying or selecting the portion of the image.

The device can generate multiple zoomed images from the image using digital zoom at different zoom strengths (also referred to as zoom levels), such that the zoomed images include the portion of the image. For example, the device can generate first zoomed image by digitally zooming in on the portion of the image using a first zoom strength (e.g., 2× zoom). The device can generate a second zoomed image by digitally zooming in on the portion of the image using a second zoom strength (e.g., 4× zoom) that is greater than the first zoom strength. Thus, the second zoomed image is cropped and upscaled at a higher zoom strength than the first zoomed image.

The device can determine image sharpness values for each of the zoomed images. For instance, the device can determine a first image sharpness of the first zoomed image and a second image sharpness of the second zoomed image. Each of the image sharpness values can be, for example, an under-sharpening percentage calculated by the device using a modulo transfer function (MTF). The image sharpness measurements can be based on other measurements, such as line pair per millimeter (mm) measurements.

A pre-determined image characteristic threshold can be stored at the device. The device can compare the different image characteristic scores to the image characteristic threshold. The zoomed image with the greatest zoom strength whose image characteristic score value is still greater than or equal to the image characteristic threshold is selected as a selected zoomed image. The image characteristic scores may be image sharpness scores, and the image characteristic threshold may be an image sharpness threshold. In one illustrative example, the image sharpness threshold can be 80% under-sharpening. In this example, if a first zoomed image having a 1.5× zoom has a first image sharpness score of 95% under-sharpening, a second zoomed image having a 2× zoom has an image sharpness score of 86% under-sharpening, and a third zoomed image having a 2.5× zoom has an image sharpness score of 72% under-sharpening, then the second zoomed image (at 2× zoom) is the selected zoomed image because the 86% image sharpness score for the second zoomed image is greater than the 80% sharpness threshold while the 72% image sharpness score for the third zoomed image is less than the 80% sharpness threshold.

The systems and techniques described herein provide technical improvements to imaging technologies that apply digital zoom techniques. For instance, the systems and techniques described herein maximize digital zoom strength while retaining high levels of image characteristics such as sharpness, contrast, and clarity. This grants benefits of digital zoom, such as the ability to perform a zoom operation without specialized hardware (e.g., telephoto lenses) while retaining a high image quality.

FIG. 1 is a block diagram illustrating an architecture of an image capture and processing system 100. The image capture and processing system 100 includes various components that are used to capture and process images of scenes (e.g., an image of a scene 110). The image capture and processing system 100 can capture standalone images (or photographs) and/or can capture videos that include multiple images (or video frames) in a particular sequence. A lens 115 of the system 100 faces a scene 110 and receives light from the scene 110. The lens 115 bends the light toward the image sensor 130. The light received by the lens 115 passes through an aperture controlled by one or more control mechanisms 120 and is received by an image sensor 130.

The one or more control mechanisms 120 may control exposure, focus, and/or zoom based on information from the image sensor 130 and/or based on information from the image processor 150. The one or more control mechanisms 120 may include multiple mechanisms and components; for instance, the control mechanisms 120 may include one or more exposure control mechanisms 125A, one or more focus control mechanisms 125B, and/or one or more zoom control mechanisms 125C. The one or more control mechanisms 120 may also include additional control mechanisms besides those that are illustrated, such as control mechanisms controlling analog gain, flash, HDR, depth of field, and/or other image capture properties.

The focus control mechanism 125B of the control mechanisms 120 can obtain a focus setting. In some examples, focus control mechanism 125B store the focus setting in a memory register. Based on the focus setting, the focus control mechanism 125B can adjust the position of the lens 115 relative to the position of the image sensor 130. For example, based on the focus setting, the focus control mechanism 125B can move the lens 115 closer to the image sensor 130 or farther from the image sensor 130 by actuating a motor or servo (or other lens mechanism), thereby adjusting focus. In some cases, additional lenses may be included in the system 100, such as one or more microlenses over each photodiode of the image sensor 130, which each bend the light received from the lens 115 toward the corresponding photodiode before the light reaches the photodiode. The focus setting may be determined via contrast detection autofocus (CDAF), phase detection autofocus (PDAF), hybrid autofocus (HAF), or some combination thereof. The focus setting may be determined using the control mechanism 120, the image sensor 130, and/or the image processor 150. The focus setting may be referred to as an image capture setting and/or an image processing setting.

The exposure control mechanism 125A of the control mechanisms 120 can obtain an exposure setting. In some cases, the exposure control mechanism 125A stores the exposure setting in a memory register. Based on this exposure setting, the exposure control mechanism 125A can control a size of the aperture (e.g., aperture size or f/stop), a duration of time for which the aperture is open (e.g., exposure time or shutter speed), a sensitivity of the image sensor 130 (e.g., ISO speed or film speed), analog gain applied by the image sensor 130, or any combination thereof. The exposure setting may be referred to as an image capture setting and/or an image processing setting.

The zoom control mechanism 125C of the control mechanisms 120 can obtain a zoom setting. In some examples, the zoom control mechanism 125C stores the zoom setting in a memory register. In some examples zoom setting may include a digital zoom setting. In some examples, the zoom setting may include an optical zoom setting. Based on the zoom setting, the zoom control mechanism 125C can control which of a set of cameras is active, a focal length of an assembly of lens elements (lens assembly) that includes the lens 115 and/or one or more additional lenses, or a combination thereof. For example, the zoom control mechanism 125C can control the focal length of the lens assembly by actuating one or more motors or servos of the zoom control mechanism 125C) to move one or more of the lenses relative to one another. The zoom setting may be referred to as an image capture setting and/or an image processing setting.

The image sensor 130 includes one or more arrays of photodiodes or other photosensitive elements. Each photodiode measures an amount of light that eventually corresponds to a particular pixel in the image produced by the image sensor 130. In some cases, different photodiodes may be covered by different color filters, and may thus measure light matching the color of the filter covering the photodiode. For instance, Bayer color filters include red color filters, blue color filters, and green color filters, with each pixel of the image generated based on red light data from at least one photodiode covered in a red color filter, blue light data from at least one photodiode covered in a blue color filter, and green light data from at least one photodiode covered in a green color filter. Other types of color filters may use yellow, magenta, and/or cyan (also referred to as "emerald") color filters instead of or in addition to red, blue, and/or green color filters. Some image sensors (e.g., image sensor 130) may lack color filters altogether, and may instead use different photodiodes throughout the pixel array (in some cases vertically stacked). The different photodiodes throughout the pixel array can have different spectral sensitivity curves, therefore responding to different wavelengths of light. Monochrome image sensors may also lack color filters and therefore lack color depth.

In some cases, the image sensor 130 may alternately or additionally include opaque and/or reflective masks that block light from reaching certain photodiodes, or portions of certain photodiodes, at certain times and/or from certain angles, which may be used for phase detection autofocus (PDAF). The image sensor 130 may also include an analog gain amplifier to amplify the analog signals output by the photodiodes and/or an analog to digital converter (ADC) to convert the analog signals output of the photodiodes (and/or amplified by the analog gain amplifier) into digital signals. In some cases, certain components or functions discussed with respect to one or more of the control mechanisms 120 may be included instead or additionally in the image sensor 130. The image sensor 130 may be a charge-coupled device (CCD) sensor, an electron-multiplying CCD (EMCCD) sensor, an active-pixel sensor (APS), a complimentary metal-oxide semiconductor (CMOS), an N-type metal-oxide semiconductor (NMOS), a hybrid CCD/CMOS sensor (e.g., sCMOS), or some other combination thereof.

The image processor 150 may include one or more processors, such as one or more image signal processors (ISPs) (including ISP 154), one or more host processors (including host processor 152), and/or one or more of any other type of processor 710 discussed with respect to the computing system 700. The host processor 152 can be a digital signal processor (DSP) and/or other type of processor. In some implementations, the image processor 150 is a single integrated circuit or chip (e.g., referred to as a system-on-chip or SoC) that includes the host processor 152 and the ISP 154. In some cases, the chip can also include one or more input/output ports (e.g., input/output (I/O) ports 156), central processing units (CPUs), graphics processing units (GPUs), broadband modems (e.g., 3G, 4G or LTE, 5G, etc.), memory, connectivity components (e.g., Bluetooth™, Global Positioning System (GPS), etc.), any combination thereof, and/or other components. The I/O ports 156 can include any suitable input/output ports or interface according to one or more protocol or specification, such as an Inter-Integrated Circuit 2 (I2C) interface, an Inter-Integrated Circuit 3 (I3C) interface, a Serial Peripheral Interface (SPI) interface, a serial General Purpose Input/Output (GPIO) interface, a Mobile Industry Processor Interface (MIPI) (such as a MIPI CSI-2 physical (PHY) layer port or interface, an Advanced High-performance Bus (AHB) bus, any combination thereof, and/or other input/output port. In one illustrative example, the host processor 152 can communicate with the image sensor 130 using an I2C port, and the ISP 154 can communicate with the image sensor 130 using an MIPI port.

The image processor 150 may perform a number of tasks, such as de-mosaicing, color space conversion, image frame downsampling, pixel interpolation, automatic exposure (AE) control, automatic gain control (AGC), CDAF, PDAF, automatic white balance, merging of image frames to form an HDR image, image recognition, object recognition, feature recognition, receipt of inputs, managing outputs, managing memory, or some combination thereof. The image processor 150 may store image frames and/or processed images in random access memory (RAM) 140/720, read-only memory (ROM) 145/725, a cache, a memory unit, another storage device, or some combination thereof.

Various input/output (I/O) devices 160 may be connected to the image processor 150. The I/O devices 160 can include a display screen, a keyboard, a keypad, a touchscreen, a trackpad, a touch-sensitive surface, a printer, any other output devices 735, any other input devices 745, or some combination thereof. In some cases, a caption may be input into the image processing device 105B through a physical keyboard or keypad of the I/O devices 160, or through a virtual keyboard or keypad of a touchscreen of the I/O devices 160. The I/O 160 may include one or more ports, jacks, or other connectors that enable a wired connection between the system 100 and one or more peripheral devices, over which the system 100 may receive data from the one or more peripheral device and/or transmit data to the one or more peripheral devices. The I/O 160 may include one or more wireless transceivers that enable a wireless connection between the system 100 and one or more peripheral devices, over which the system 100 may receive data from the one or more peripheral device and/or transmit data to the one or more peripheral devices. The peripheral devices may include any of the previously-discussed types of I/O devices 160 and may themselves be considered I/O devices 160 once they are coupled to the ports, jacks, wireless transceivers, or other wired and/or wireless connectors.

In some cases, the image capture and processing system 100 may be a single device. In some cases, the image capture and processing system 100 may be two or more separate devices, including an image capture device 105A (e.g., a camera) and an image processing device 105B (e.g., a computing system coupled to the camera). In some implementations, the image capture device 105A and the image processing device 105B may be coupled together, for example via one or more wires, cables, or other electrical connectors, and/or wirelessly via one or more wireless transceivers. In some implementations, the image capture device 105A and the image processing device 105B may be disconnected from one another.

As shown in FIG. 1, a vertical dashed line divides the image capture and processing system 100 of FIG. 1 into two portions that represent the image capture device 105A and the image processing device 105B, respectively. The image capture device 105A includes the lens 115, control mechanisms 120, and the image sensor 130. The image processing device 105B includes the image processor 150 (including the ISP 154 and the host processor 152), the RAM 140, the ROM 145, and the I/O 160. In some cases, certain components illustrated in the image capture device 105A, such as the ISP 154 and/or the host processor 152, may be included in the image capture device 105A.

The image capture and processing system 100 can include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the image capture and processing system 100 can include one or more wireless transceivers for wireless communications, such as cellular network communications, 802.11 wi-fi communications, wireless local area network (WLAN) communications, or some combination thereof. In some implementations, the image capture device 105A and the image processing device 105B can be different devices. For instance, the image capture device 105A can include a camera device and the image processing device 105B can include a computing system, such as a mobile handset, a desktop computer, or other computing system.

While the image capture and processing system 100 is shown to include certain components, one of ordinary skill will appreciate that the image capture and processing system 100 can include more components than those shown in FIG. 1. The components of the image capture and processing system 100 can include software, hardware, or one or more combinations of software and hardware. For example, in some implementations, the components of the image capture and processing system 100 can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the image capture and processing system 100.

In some examples, optical zoom may be controlled using the lens 115, zoom control mechanism 125C, image processor 150, the ISP 154, and/or the host processor 152. In some examples, digital zoom may be controlled using the zoom control mechanism 125C, the image processor 150, the ISP 154, and/or the host processor 152.

Figure 2:
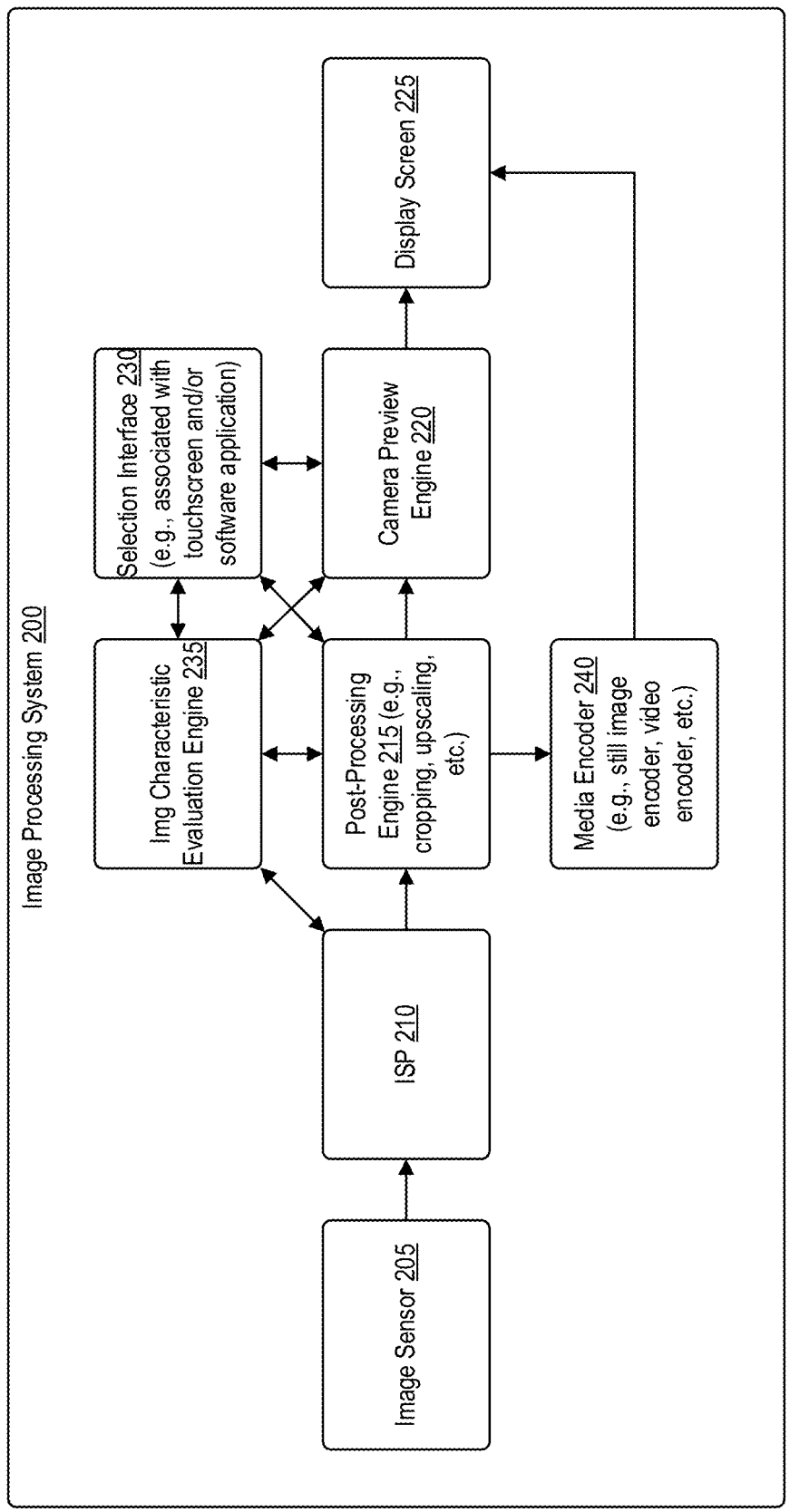
FIG. 2 is a block diagram illustrating an architecture of an image processing system that includes an image characteristic evaluation engine.

FIG. 2 is a block diagram illustrating an architecture of an image processing system 200 that includes an image characteristic evaluation engine 235. The image processing system 200 includes an image sensor 205. The image sensor 205 may be an example of an image sensor 130. In some examples, the image sensor 205 can include one or more additional components (e.g., the control mechanisms 120). The image sensor 205 can capture image data corresponding to an image. The image can be sent from the image sensor 205 to the image signal processor (ISP) 210, which can receive the image from the image sensor 205. The ISP 210 can be an example of the ISP 154. In some examples, the ISP 210 can include one or more additional components (e.g., the image processor 150, the host processor 152, the I/O 156, the I/O 160, the ROM 145, the RAM 140). The ISP 210 can perform some processing operations on the image to at least partially process the image. For example, the ISP 210 can perform demosaicking, color space conversion (e.g., RGB to YUV), white balance adjustment, black balance adjustment, or a combination thereof. The ISP 210 can send the image to the post-processing engine 215, which can receive the image from the ISP 210. The ISP 210 can send the image to the image characteristic evaluation engine 235, which can receive the image from the ISP 210.

The post-processing engine 215 can be an example of the host processor 152. The post-processing engine 215 can be an example of the image processor 150. In some examples, the post-processing engine 215 can include one or more additional components (e.g., the I/O 156, the I/O 160, the ROM 145, the RAM 140). The post-processing engine 215 can further process the image. For example, the post-processing engine 215 can perform cropping operations, resizing operations, digital zoom operations, or combinations thereof. Resizing operations can include, for example, upscaling operations, upsampling operation, downscaling operations, downsampling operations, subsampling operations, rescaling operations, resampling operations, or combinations thereof. The resizing operations can include nearest neighbor (NN) rescaling, bilinear interpolation, bicubic interpolation, Sinc resampling, Lanczos resampling, box sampling, mipmapping, Fourier-transform scaling, edge-directed interpolation, high quality scaling (HQX), a specialized context-sensitive rescaling technique, or combinations thereof. The post-processing engine 215 can send the image to a camera preview engine 220, which can receive the image from the post-processing engine 215. The post-processing engine 215 can send the image to an image characteristic evaluation engine 235, which can receive the image from the post-processing engine 215. The post-processing engine 215 can send the image to a selection interface 230, which can receive the image from the post-processing engine 215. The post-processing engine 215 can send the image to a media encoder 240, which can receive the image from the post-processing engine 215.

The image characteristic evaluation engine 235 of the image processing system 200 can receive the image from the ISP 210, from the post-processing engine 215, from the selection interface 230, from the camera preview engine 220, or a combination thereof. The image received by the image characteristic evaluation engine 235 can be processed by the ISP 210. The image received by the image characteristic evaluation engine 235 can be cropped, resized, and/or otherwise processed by the post-processing engine 215. The image characteristic evaluation engine 235 can generate an image characteristic score for the image. The image characteristic score can be a score indicative of a sharpness, contrast, and/or clarity of the image. In some examples, the characteristic score can be an under-sharpening percentage or an undefr-sharpening value. In some examples, the image characteristic evaluation engine 235 can generate the characteristic score for the image using a modulo transfer function (MTF). In some examples, the characteristic score can be a line pairs (lp) per millimeter (mm) measurement (lp/mm) value. In some examples, the image characteristic evaluation engine 235 can generate the characteristic score for the image based on an analysis of a region of interest in the image.

The image characteristic evaluation engine 235 can send the image to the post-processing engine 215, which can receive the image from the image characteristic evaluation engine 235. The post-processing engine 215 can determine which zoom strength should be used for an output image (e.g., to be encoded by the media encoder 240) based on whether the characteristic score for each zoom strength applied to image (as identified by the image characteristic evaluation engine 235) is less than, equal to, or greater than a pre-determined characteristic threshold. The image characteristic evaluation engine 235 can send the image to the camera preview engine 220, which can receive the image from the image characteristic evaluation engine 235. The camera preview engine 220 can determine which zoom strength should be used for a preview image based on whether the characteristic score for each zoom strength applied to image is less than, equal to, or greater than the pre-determined characteristic threshold. The image characteristic evaluation engine 235 can send the image to the selection interface 230, which can receive the image from the image characteristic evaluation engine 235. The camera preview engine 220 can determine which zoom strength should be used for by the selection interface 230 based on whether the characteristic score for each zoom strength applied to image is less than, equal to, or greater than the pre-determined characteristic threshold.

The camera preview engine 220 of the image processing system 200 can receive the image from the ISP 210, from the post-processing engine 215, from the selection interface 230, from the image characteristic evaluation engine 235, or a combination thereof. The camera preview engine 220 can generate a preview image based on the image that it receives. The image received by the camera preview engine 220 can be processed by the ISP 210. The image received by the camera preview engine 220 can be cropped, resized, and/or otherwise processed by the post-processing engine 215. The image received by the camera preview engine 220 can be modified by the selection interface 230. The preview image can be displayed by a display screen 225 of the image processing system 200. The preview image can act as a viewfinder that previews the image data being captured by the image sensor 205. The preview image can be updated periodically and/or in real-time. The camera preview engine 220 can send the preview image to the display screen 225, which can receive the image from the camera preview engine 220. The camera preview engine 220 can send the preview image to the selection interface 230, which can receive the image from the camera preview engine 220. The camera preview engine 220 can send the preview image to the image characteristic evaluation engine 235, which can receive the image from the camera preview engine 220.

The selection interface 230 of the image processing system 200 can receive the image from the ISP 210, from the post-processing engine 215, from the camera preview engine 220, from the image characteristic evaluation engine 235, or a combination thereof. The selection interface 230 can be associated with a touch-sensitive surface, such as a touch-sensitive surface of a touchscreen. The display screen 225 can be the touchscreen, or part of the touchscreen. The selection interface 230 can be associated with a mouse cursor, a stylus, a keyboard, a keypad, a hover input detector, a gesture input detector, or another type of input device 745. The selection interface 230 can receive one or more inputs through an input interface. The input interface may correspond to the I/O 156 and/or the I/O 160. The selection interface 230 can identify a portion of the image based on the one or more inputs (e.g., as in the touch input 335 of FIG.

3A). The selection interface 230 can send the identified portion of the image and/or the one or more inputs themselves to the post-processing engine 215, which may receive the portion of the image from the selection interface 230. The post-processing engine 215 can crop, resize, and or zoom the image based on the portion of the image identified using the one or more inputs.

The selection interface 230 can be associated with a software application. For instance, the selection interface 230 can be associated with a facial detection algorithm, a facial recognition algorithm, a facial tracking algorithm, an object detection algorithm, an object recognition algorithm, an object tracking algorithm, a feature detection algorithm, a feature recognition algorithm, a feature tracking algorithm, or a combination thereof. The selection interface 230 can be associated with one or more artificial intelligence (AI) algorithms, one or more trained machine learning (ML) models based on one or more ML algorithms, one or more trained neural networks (NNs), or a combination thereof. The software application associated with the selection interface 230 can identify a portion of the image, for instance based on the software application detecting that the portion of the image includes a depiction of a particular type of feature, object, and/or face (e.g., as in FIG. 3B). The selection interface 230 can send identified portion of the image to the post-processing engine 215, which may receive the portion of the image from the selection interface 230. The post-processing engine 215 can crop, resize, and or zoom the image based on the portion of the image identified using the detected depiction.

In some examples, the selection interface 230 of the image processing system 200 can also be used to modify the image. For example, the selection interface 230 can be associated with a software application through a user can adjust processing settings for the image, annotate the image, manually direct the post-processing engine 215 to crop the image, manually direct the post-processing engine 215 to resize the image, manually direct the post-processing engine 215 to zoom the image, rotate the image, make another change to the image, or some combination thereof. The selection interface 230 can send the image and/or inputs and/or identified portion(s) of the image to the post-processing engine 215, which can receive the image from the selection interface 230. The selection interface 230 can send the image and/or inputs and/or identified portion(s) of the image to the image characteristic evaluation engine 235, which can receive the image from the selection interface 230. The selection interface 230 can send the image and/or inputs and/or identified portion(s) of the image to the camera preview engine 220, which can receive the image from the selection interface 230.

The media encoder 240 of the image processing system 200 can receive the image from the ISP 210, from the post-processing engine 215, from the camera preview engine 220, from the image characteristic evaluation engine 235, from the selection interface 230, or a combination thereof. The image received by the camera preview engine 220 can be processed by the ISP 210. The image received by the camera preview engine 220 can be cropped, resized, and/or otherwise processed by the post-processing engine 215. The image received by the camera preview engine 220 can be modified by the selection interface 230. In some examples, the post-processing engine 215 can generate a zoomed-in version of the image at a zoom strength that the post-processing engine 215 selects based on characteristic scores for different zoom strengths determined by the image characteristic evaluation engine 235. The post-processing engine 215 can send the zoomed-in version of the image to the media encoder 240, which can receive the zoomed-in version of the image from the post-processing engine 215. The media encoder 240 can encode one or more images that the media encoder 240 receives using still image encoding techniques, such as still image compression techniques. The media encoder 240 can encode one or more images that the media encoder 240 receives using video encoding techniques, such as video compression techniques. Video encoding techniques may use the image as one of a plurality of video frames in a video, and may involve inter-frame coding and/or intra-frame coding. The media encoder 240 may generate an encoded image. The encoded image can be referred to as an output image. In some cases, an image sent to the media encoder 240 (e.g., from the processing engine 215 and/or any other sending component discussed herein) can be referred to as an output image. The media encoder 240 can send the image to the camera preview engine 220, which can receive the image from the media encoder 240. The media encoder 240 can send the image to the display screen 225, which can receive the image from the media encoder 240. The display screen 225 can display the image that it receives from the media encoder 240.

The display screen 225 of the image processing system 200 can receive the image from the media encoder 240, from the ISP 210, from the post-processing engine 215, from the camera preview engine 220, from the image characteristic evaluation engine 235, from the selection interface 230, or a combination thereof. The display screen 225 can display the image. The display screen 225 can be any type of display screen or other display device (e.g., projector). The display screen 225 can be, or can include, any elements discussed with respect to the output device 735. For example, the display screen 225 can also include speakers, which may output audio that corresponds to the image (e.g., if the image is a video frame of a video that includes an audio track). The display screen 225 can correspond to the I/O 156 and/or the I/O 160.

Figure 3A:
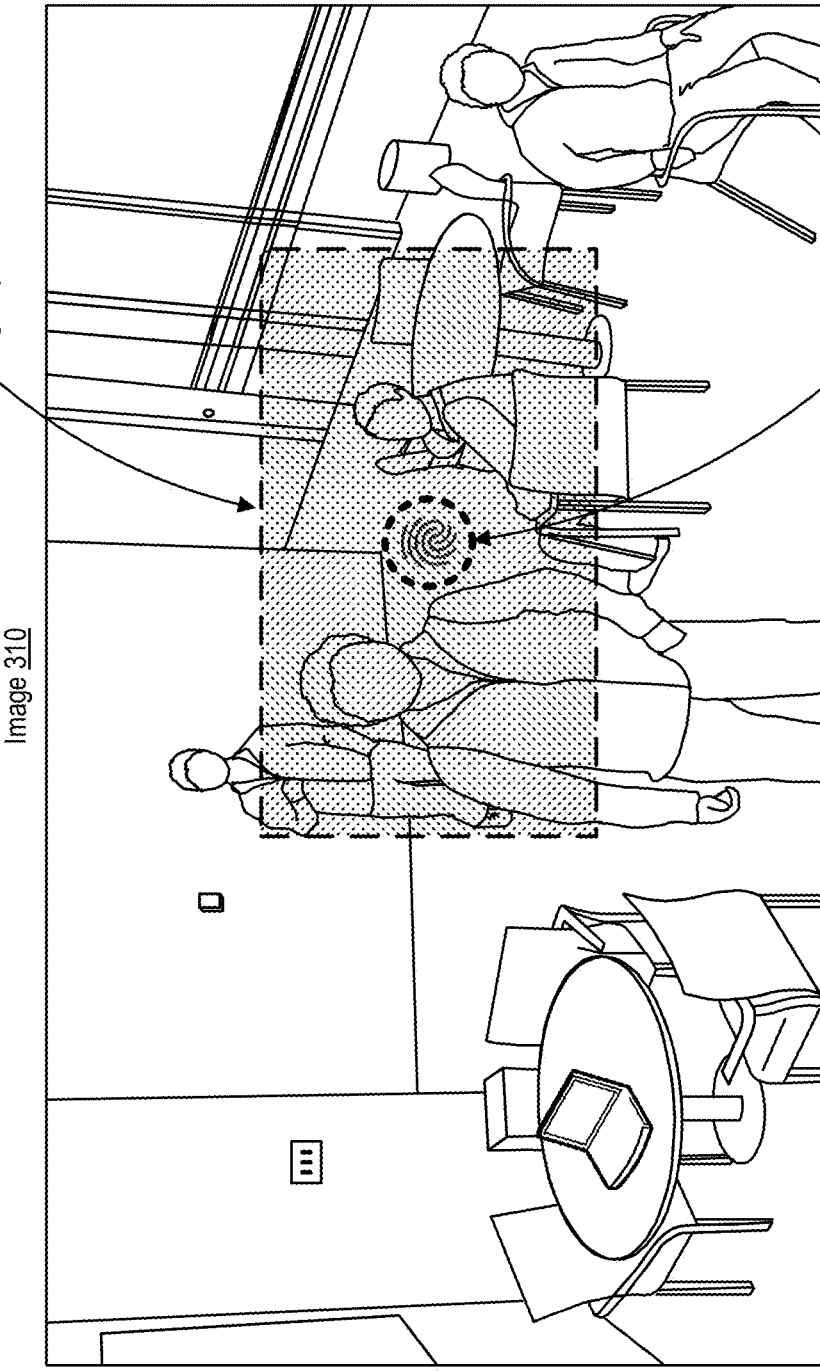
FIG. 3A is a conceptual diagram illustrating a selection interface in which a digitally zoomed portion of an image is centered around a portion of the image that is identified based on a touch input.

FIG. 3A is a conceptual diagram 300A illustrating a selection interface in which a digitally zoomed portion 320 of an image 310 is centered around a portion 330 of the image 310 that is identified based on a touch input 335. The image 310 illustrates an office environment with four people sitting or standing around a set of desks and chairs. A fingerprint icon is overlaid over the image 310 in FIG. 3A. The fingerprint icon represents the touch input 335 received through the selection interface (e.g., the selection interface 230). The selection interface may include a touch-sensitive surface, such as a touch-sensitive surface of a touchscreen. The selection interface identifies, based on the location of the touch input 335 on the display screen, and based on the positioning of the image 310 as displayed on the display screen, an identified portion 330 of the image 310 that includes at least a subset of the area covered by the touch input 335. The identified portion 330 of the image 310 is illustrated as circular portion 330 of the image 310 that is outlined using dashed lines. In some cases, the identified portion 330 of the image 310 can simply be a point representing a center of the area covered by the touch input 335, or representing a click of a cursor, or representing a point touched by a stylus, or some combination thereof.

The selection interface identifies the digitally zoomed portion 320 of the image 310 based on the identified portion 330 of the image 310. For instance, the digitally zoomed portion 320 of the image 310 in FIG. 3A is centered on the identified portion 330 of the image 310. The digitally zoomed portion 320 of the image 310 is illustrated in FIG.

3A as a shaded rectangle outlined by dashed lines. The digitally zoomed portion 320 of the image 310 represents a crop area of the image 310 for a digital zoom operation. For instance, in a digital zoom operation, everything outside of the digitally zoomed portion 320 of the image 310 is cropped out, leaving only the digitally zoomed portion 320 of the image 310 remaining. The digital zoom operation can resize (e.g., upscale and/or upsample) the digitally zoomed portion 320 of the image 310 before or after cropping.

Figure 3B:
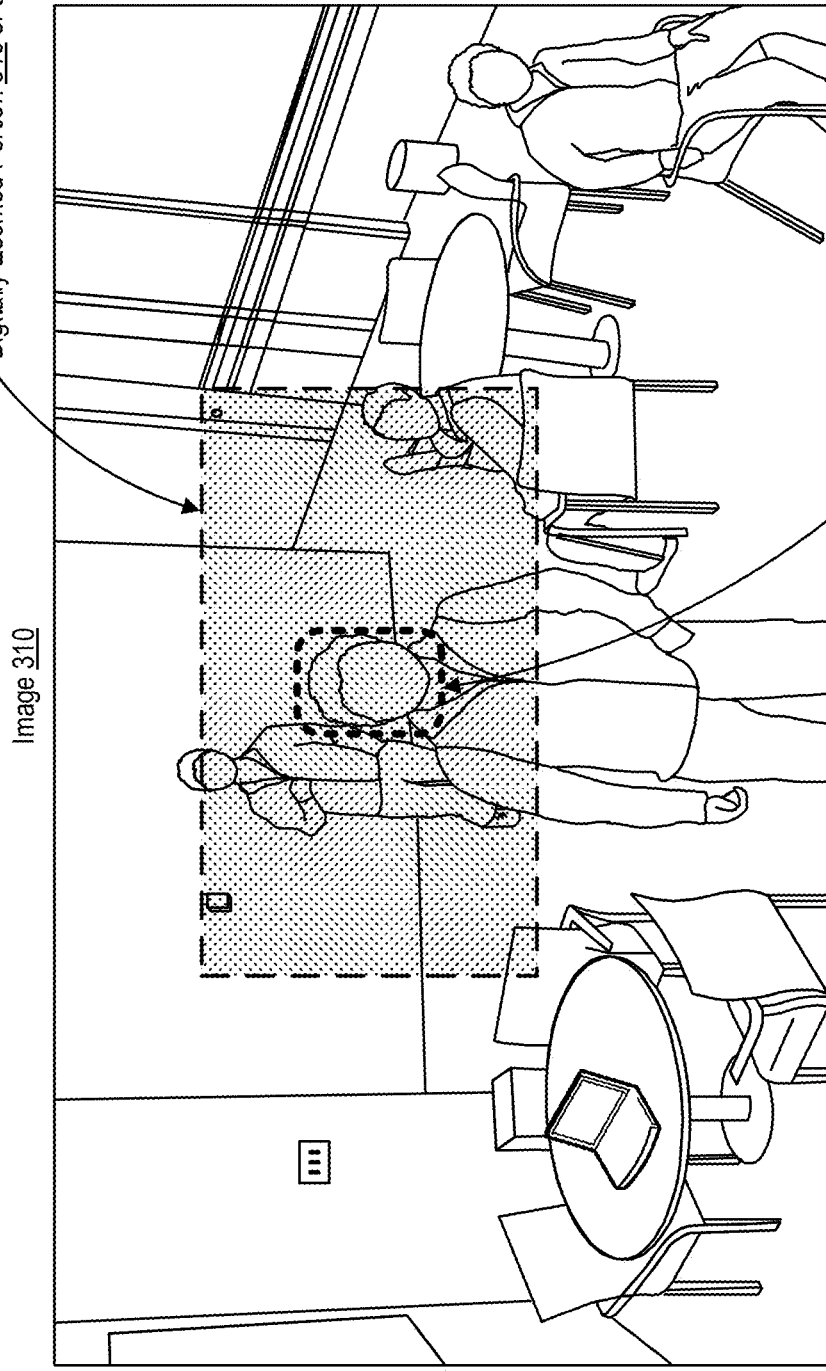
FIG. 3B is a conceptual diagram illustrating a selection interface in which a digitally zoomed portion of an image is centered around a portion of the image that is identified based on an image analysis.

FIG. 3B is a conceptual diagram 300B illustrating a selection interface in which a digitally zoomed portion 340 of an image 310 is centered around a portion 350 of the image 310 that is identified based on an image analysis. The image 310 illustrated in FIG. 3B is the same image 310 of the office environment illustrated in FIG. 3A. The image analysis identifies a face of one of the people in the image 310, as represented by the dashed rounded rectangle illustrated around the face and identified as representing the identified portion 350 of the image 310. In some examples, image analysis identifies the portion 350 of the image 310 by detecting the face using a facial detection algorithm 355. In some examples, image analysis identifies the portion 350 of the image 310 by recognizing the face using a facial recognition algorithm 355. The identified portion 350 of the image 310 may be a bounding box around the face that is generated by the image analysis based on detection of the face. The digitally zoomed portion 340 of the image 310 based on the identified portion 350 of the image 310. For instance, the digitally zoomed portion 340 of the image 310 in FIG. 3B is centered on the identified portion 350 of the image 310. The digitally zoomed portion 340 of the image 310 represents a crop area of the image 310 for a digital zoom operation. The digitally zoomed portion 340 of the image 310 is illustrated in FIG. 3B as a shaded rectangle outlined by dashed lines.

While the digitally zoomed portion 340 of the image 310 is illustrated as centered on the identified portion 350 of the image 310, it need not be. In some examples, the digitally zoomed portion 340 of the image 310 can include the identified portion 350 of the image 310 without being centered on the identified portion 350 of the image 310. In some examples, the digitally zoomed portion 340 of the image 310 can be identified based on the identified portion 350 of the image 310 without including the identified portion 350 of the image 310. For instance, the identified portion 350 of the image 310 can represent a corner or side of the digitally zoomed portion 340 of the image 310. Similarly, while the digitally zoomed portion 340 of the image 310 is illustrated as centered on the identified portion 330 of the image 310, it need not be. In some examples, the digitally zoomed portion 340 of the image 310 can include the identified portion 330 of the image 310 without being centered on the identified portion 330 of the image 310. In some examples, the digitally zoomed portion 340 of the image 310 can be identified based on the identified portion 330 of the image 310 without including the identified portion 330 of the image 310. For instance, the identified portion 330 of the image 310 can represent a corner or side of the digitally zoomed portion 340 of the image 310.

In some examples, a semantic analysis algorithm performing a semantic analysis of the image 310 can be used in place of, or in addition to, the facial recognition algorithm 355. The semantic analysis can, for example, perform segmentation between one or more foreground elements from one or more background elements. The semantic analysis can perform the segmentation based on analysis of the image itself, analysis of other images of the same scene (e.g., prior image frames in a video of the scene), analysis of depth information from a depth sensor (e.g., from LIDAR, RADAR, SONAR, SODAR, time of flight sensor, structured light sensor, or a combination thereof), or a combination thereof. For instance, the identified portion 350 of the image can be selected based on semantic analysis of the image 310 indicating that the identified portion 350 of the image includes a depiction of a foreground element. In some examples, an identified portion of an image can be selected based on semantic analysis of the image 310 indicating that the identified portion 350 of the image includes a depiction of a background element. The semantic analysis can identify a subject of interest. For instance, the identified portion 350 of the image can be selected based on semantic analysis of the image 310 indicating that the identified portion 350 of the image includes a depiction of the subject of interest. The semantic analysis can identify a region of interest. For instance, the identified portion 350 of the image can be selected based on semantic analysis of the image 310 indicating that the identified portion 350 of the image includes the region of interest. The semantic analysis can identify a scene depicted in the image. For instance, the identified portion 350 of the image can be selected based on semantic analysis of the image 310 indicating that the identified portion 350 of the image includes a depiction of a particular part of the scene depicted in the image.

In some examples, a digitally zoomed portion of an image may be identified based on a combination of one or more inputs from an input interface (e.g., the touch input 335 of FIG. 3A) and one or more inputs from an image analysis (e.g., the facial detection algorithm 355 of FIG. 3B, an object detection algorithm, a feature detection algorithm, the semantic analysis discussed above, or a combination thereof). For example, image analysis can identify that an input from an input interface is near a depiction of a face in the image 310. The selection interface can center the digitally zoomed portion of the image on a point along a line between the center of the input from the input interface and the center of the bounding box including the detected depiction of a face in the image 310. For example, the point can be at the halfway point along the line.

Figure 4A:
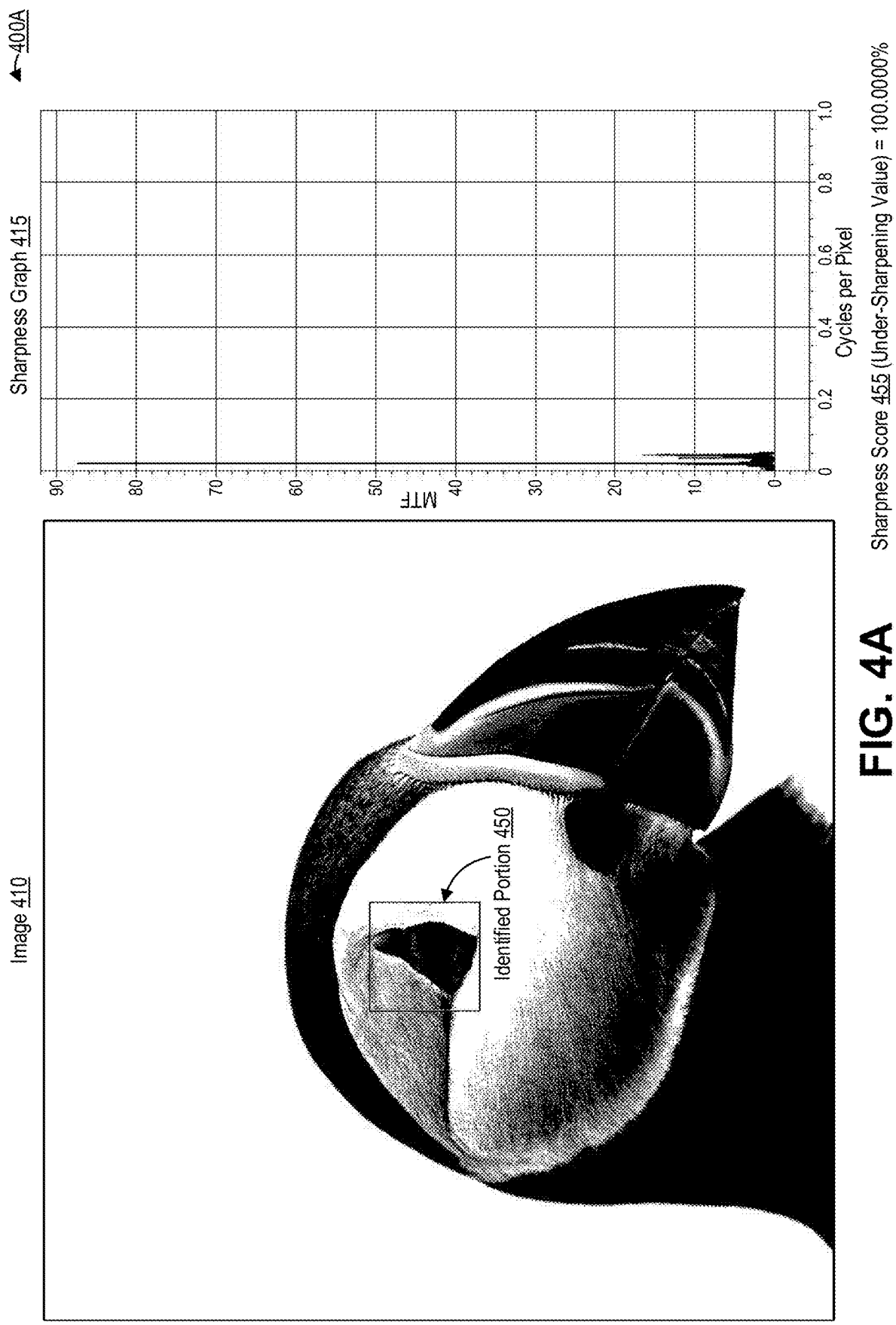
FIG. 4A is a conceptual diagram illustrating an image and a corresponding sharpness graph.

FIG. 4A is a conceptual diagram 400A illustrating an image 410 and a corresponding sharpness graph 415. The image 410 depicts a bird. One side of the bird's head is depicted in the image 410. One of the bird's eyes is depicted in the image 410. A square is overlaid over the image 410 around the eye of the bird and represents an identified portion 450 of the image 410. The identified portion 450 of the image 410 may be identified by a selection interface based on an input from an input interface (e.g., a touch input over the eye of the bird), based on an image analysis (e.g., an object detector identifying the eye of the bird), or based on a combination thereof.

Figure 4B:
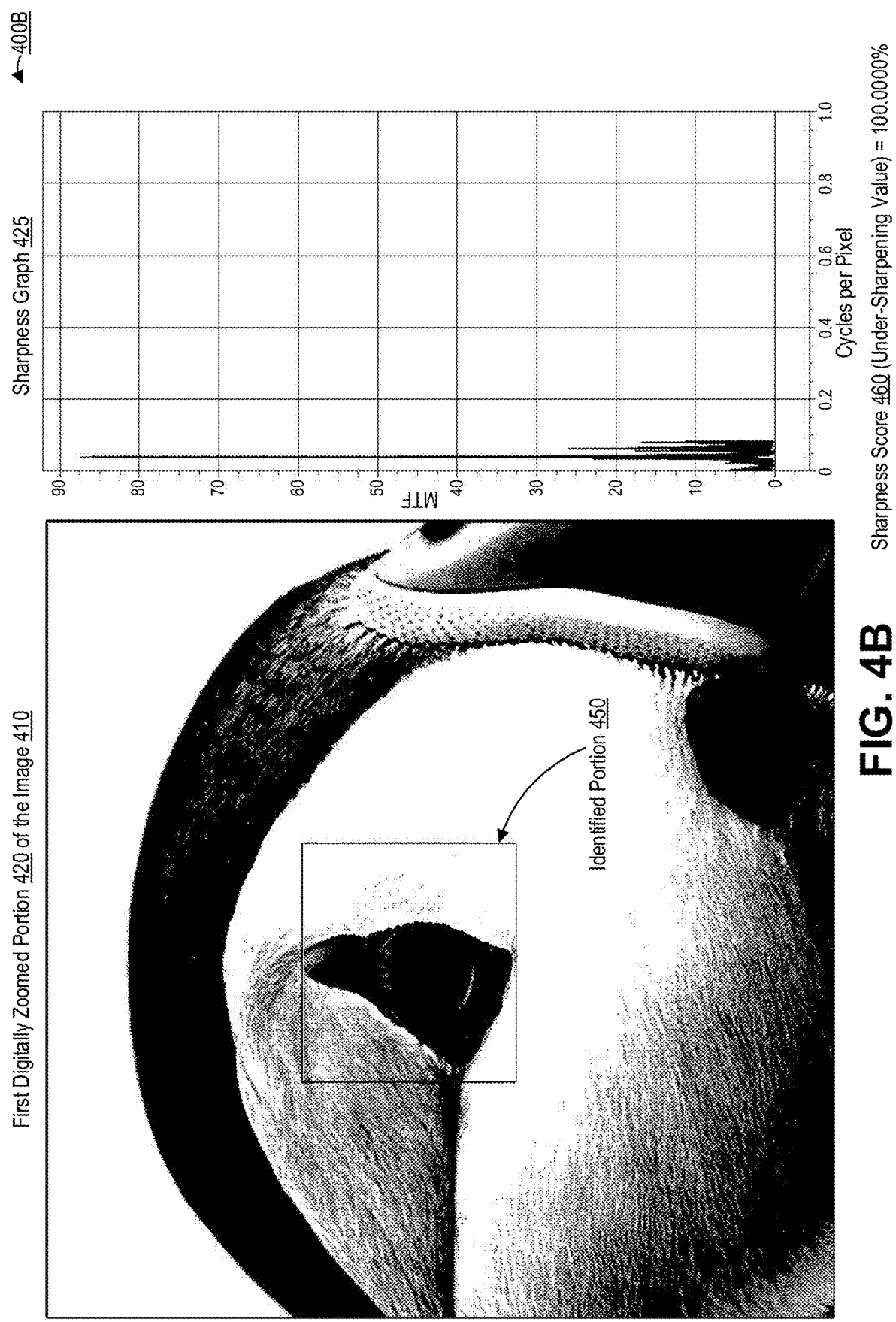
FIG. 4B is a conceptual diagram illustrating a first digitally zoomed portion of the image of FIG. 4A and a corresponding sharpness graph.
Figure 4C:
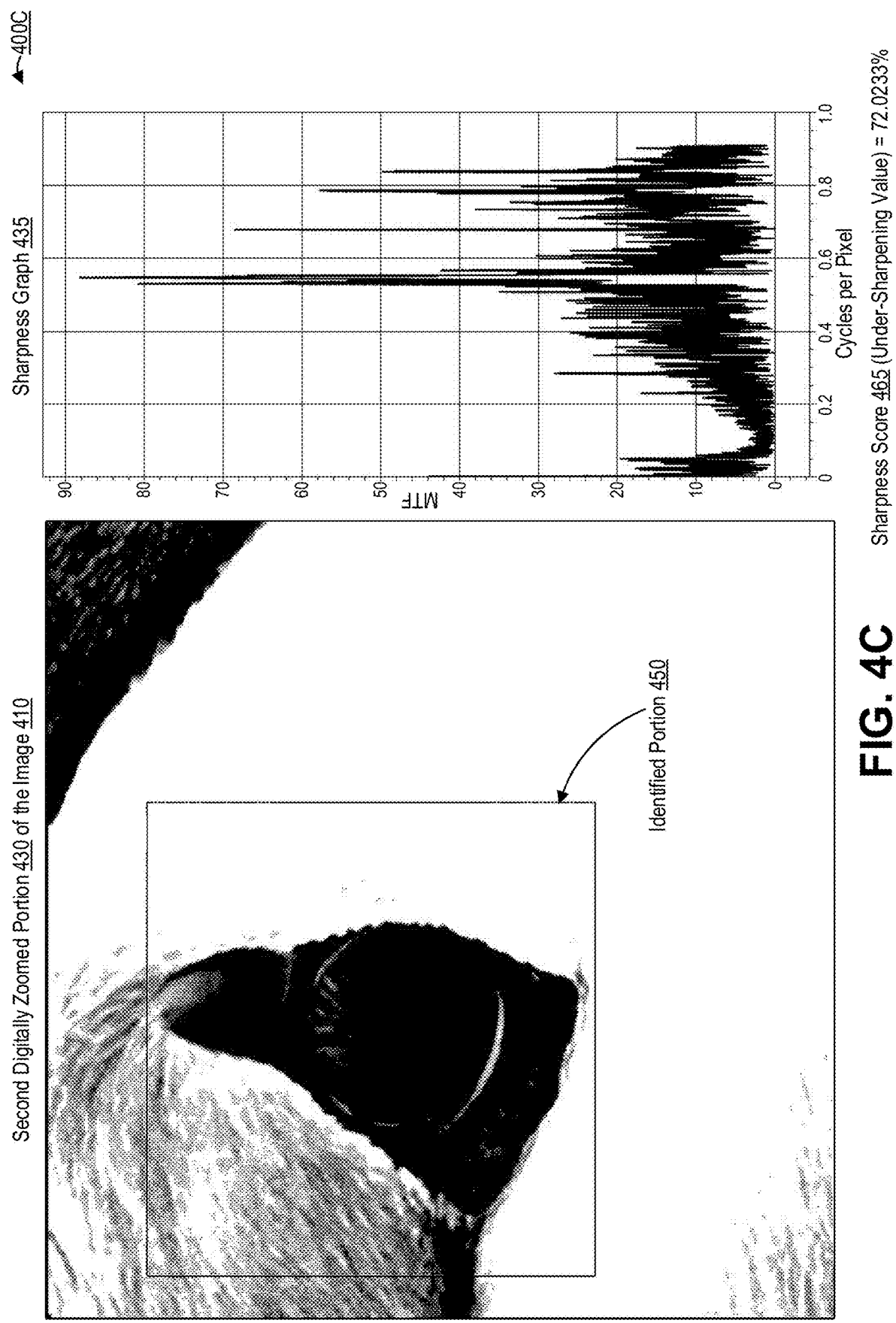
FIG. 4C is a conceptual diagram illustrating a second digitally zoomed portion of the image of FIG. 4A and a corresponding sharpness graph.

In the context of FIGS. 4A-4C, sharpness scores are used as image characteristic scores. In particular, in FIGS. 4A-4C, under-sharpness values are used as image characteristic scores. The image 410 has a high image characteristic score—a high under-sharpening value 455—of 100%. The sharpness graph 415 shows the sharpness scoring of the image 410. The sharpness graph 415 includes a vertical axis, along which the sharpness graph 415 charts the result of a modulation transfer function (MTF). The results of the MTF may be referred to as a modulation, a characteristic score, a sharpness, an under-sharpening percentage, a contrast, a spatial frequency response, or some combination thereof. In some examples, the MTF may be identified based on an equation Modulation=$(I_{max}-I_{min})/(I_{max}+I_{min})$. In this equation, $I_{max}$ can represent a maximal intensity, while $I_{min}$ can represent a minimal intensity. The sharpness graph 415 includes a horizontal axis, along which the sharpness graph 415 charts cycles per pixel. Cycles per pixel can represent how many cycles of maximal intensity lines (e.g., black lines) alternating with minimal intensity lines (e.g., white lines) are (or would be) discernable per pixel at the current level of sharpness (e.g., characteristic score).

FIG. 4B is a conceptual diagram 400B illustrating a first digitally zoomed portion 420 of the image 410 of FIG. 4A and a corresponding sharpness graph 425. The first digitally zoomed portion 420 of the image 410 is a cropped and resized (e.g. upscaled and/or upsampled) portion of the image 410 of FIG. 4A, according to a first zoom strength. The first digitally zoomed portion 420 of the image 410 is centered on the identified portion 450 of the image. The first digitally zoomed portion 420 of the image 410 has a high characteristic score—a high under-sharpening value 460—of 100%. The sharpness graph 425 shows the sharpness scoring of the image 410.

FIG. 4C is a conceptual diagram 400C illustrating a second digitally zoomed portion 430 of the image 410 of FIG. 4A and a corresponding sharpness graph 435. In some examples, the second digitally zoomed portion 430 of the image 410 is a cropped and resized (e.g. upscaled and/or upsampled) portion of the image 410 of FIG. 4A, according to a second zoom strength that is stronger than the first zoom strength used in FIG. 4B. In some examples, the second digitally zoomed portion 430 of the image 410 is a cropped and resized (e.g. upscaled and/or upsampled) portion of the first digitally zoomed portion 420 of the image 410 of FIG. 4B.

The second digitally zoomed portion 430 of the image 410 includes the identified portion 450 of the image. The second digitally zoomed portion 430 of the image 410 is vertically centered on the identified portion 450 of the image. The second digitally zoomed portion 430 of the image 410 is not horizontally centered on the identified portion 450 of the image, with the identified portion 450 of the image slightly left of center in the second digitally zoomed portion 430 of the image 410. The second digitally zoomed portion 430 of the image 410 has a lower characteristic score—a lower under-sharpening value 465—of 72%. The sharpness graph 435 shows the sharpness scoring of the image 410.

To retaining image sharpness, an image processing device can output the version of the image 410 having the highest zoom strength (the most zoomed-in version of the image 410) that still has a characteristic score above a pre-determined characteristic threshold. Here, the characteristic score for the image 410 of FIG. 4A is 100%, the characteristic score for the first digitally zoomed portion 420 of the image 410 of FIG. 4B is 100%, and the characteristic score for the second digitally zoomed portion 430 of the image 410 of FIG. 4C is 72%. If the pre-determined characteristic threshold is above 72% (e.g, 75%, 80%, 85%, 90%, 95%, 99%), then the first digitally zoomed portion 420 of the image 410 of FIG. 4B is output by the image processing device, since its 100% characteristic score exceeds the pre-determined characteristic threshold. If the pre-determined characteristic threshold is below 72% (e.g, 70%, 65%, 60%, 55%, 50%), then the second digitally zoomed portion 430 of the image 410 of FIG. 4C can be output by the image processing device, since its 72% characteristic score exceeds the pre-determined characteristic threshold.

In the context of FIG. 4A through FIG. 4C, the characteristic scores are generated based on a sharpness analysis (e.g., as discussed with respect to the image characteristic evaluation engine 235) of the identified portion 450 of the image 410. The identified portion 450 of the image 410 is included in the image 410 of FIG. 4A, the first digitally zoomed portion 420 of the image 410 of FIG. 4B, and the second digitally zoomed portion 430 of the image 410 of FIG. 4C. Thus, characteristic scores based on the identified portion 450 of the image 410 as depicted in each of these can provide a direct comparison between the image 410 of FIG. 4A, the first digitally zoomed portion 420 of the image 410 of FIG. 4B, and the second digitally zoomed portion 430 of the image 410 of FIG. 4C.

In some examples, the characteristic score for the image 410 of FIG. 4A can be generated based on a sharpness analysis of the entire image 410 of FIG. 4A. In some examples, the characteristic score for the first digitally zoomed portion 420 of the image 410 of FIG. 4B can be generated based on a sharpness analysis of the entire first digitally zoomed portion 420 of the image 410 of FIG. 4B. In some examples, the characteristic score for the second digitally zoomed portion 430 of the image 410 of FIG. 4C can be generated based on a sharpness analysis of the entire second digitally zoomed portion 430 of the image 410 of FIG. 4C.

Figure 5:
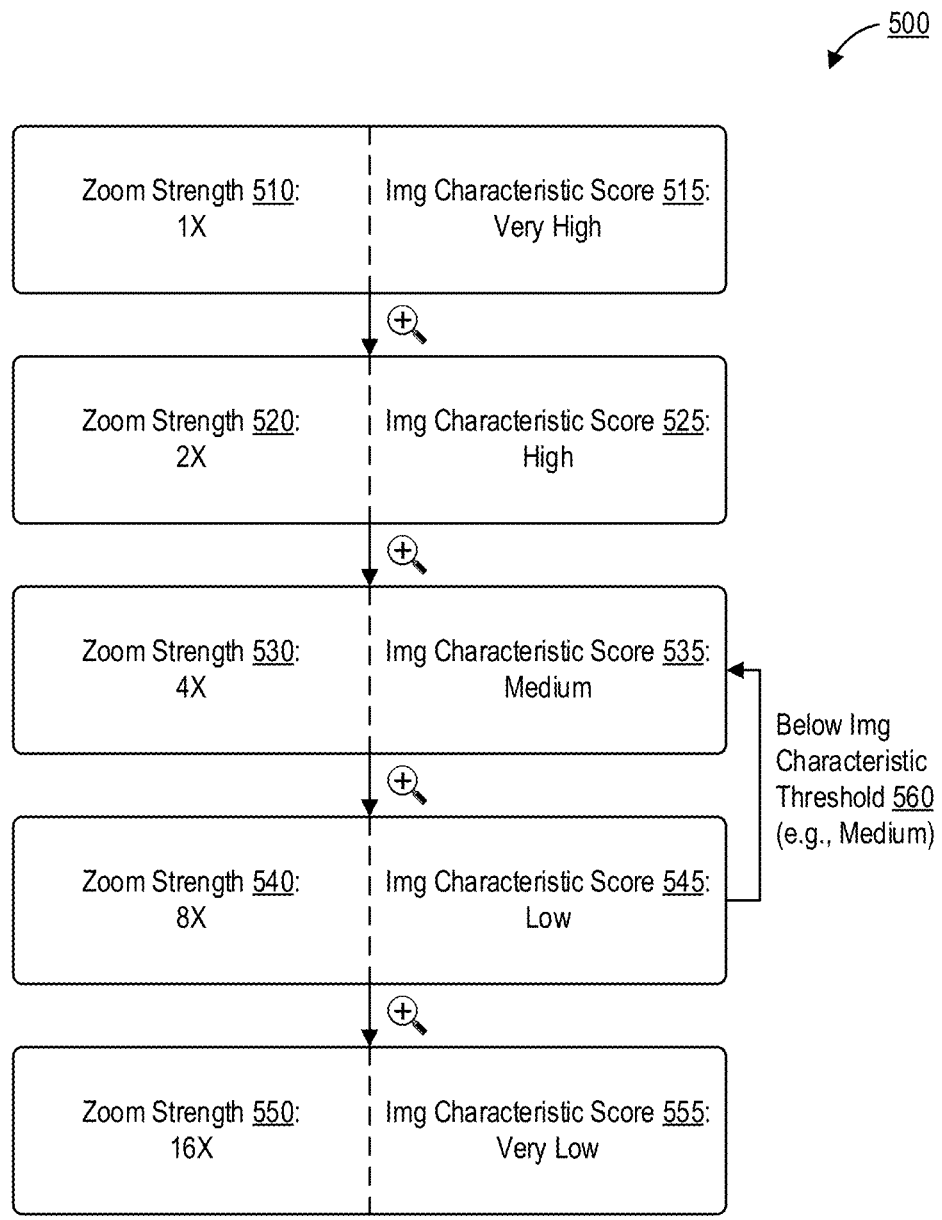
FIG. 5 is a conceptual diagram illustrating a different zoom strengths and corresponding characteristic scores along a series of incremental zoom operations.

FIG. 5 is a conceptual diagram 500 illustrating a different zoom strengths and corresponding characteristic scores along a series of incremental zoom operations. An image processing system receives an image captured by an image sensor. A first zoom strength 510 of 1× for the image corresponds to the image as received from the image sensor. The image processing system performs a sharpness analysis of the image at the first zoom strength 510 of 1×, and generates a first characteristic score 515 of "very high."

The image processing system performs a digital zoom-in operation on the original image to produce a zoomed image at a second zoom strength 520 of 2×. The image processing system performs a sharpness analysis of the zoomed image at the second zoom strength 520 of 2×, and generates a second characteristic score 525 of "high."

In some examples, the image processing system performs a second digital zoom-in operation to zoom in on the zoomed image at the second zoom strength 520 of 2× by an extra factor of 2×, producing the a zoomed image at a total third zoom strength 530 of 4×. In some examples, the image processing system can generate the zoomed image at the third zoom strength 530 of 4× directly from the original image by applying the third zoom strength 530 of 4× directly to the original image. The image processing system performs a sharpness analysis of the zoomed image at the third zoom strength 530 of 4×, and generates a third characteristic score 535 of "medium."

In some examples, the image processing system performs a third digital zoom-in operation to zoom in on the zoomed image at the third zoom strength 530 of 4× by an extra factor of 2×, producing the a zoomed image at a total fourth zoom strength 540 of 8×. In some examples, the image processing system can generate the zoomed image at the fourth zoom strength 540 of 8× directly from the original image by applying the total fourth zoom strength 540 of 8× directly to the original image. The image processing system performs a sharpness analysis of the zoomed image at the fourth zoom strength 540 of 8×, and generates a fourth characteristic score 545 of "low."

In some examples, the image processing system performs a fourth digital zoom-in operation to zoom in on the zoomed image at the fourth zoom strength 540 of 8× by an extra factor of 2×, producing the a zoomed image at a total fifth zoom strength 550 of 16×. In some examples, the image processing system can generate the zoomed image at the fifth zoom strength 550 of 16× directly from the original image by applying the fifth zoom strength 550 of 16× directly to the original image. The image processing system performs a sharpness analysis of the zoomed image at the fifth zoom strength 550 of 16×, and generates a fifth characteristic score 555 of "very low."

In some examples, the image processing system identifies that the fourth characteristic score 545 is less than a predetermined characteristic threshold 560. For example, the predetermined characteristic threshold 560 can be "medium." The third characteristic score 535 is "medium," and is therefore equal to the predetermined characteristic threshold 560. In some examples, the image processing system can determine that it will output, as its output image, the zoomed image at the third zoom strength 530 of 4× based on the third characteristic score 535 ("medium") meeting or exceeding the predetermined characteristic threshold 560 ("medium"). In some examples, meeting the predetermined characteristic threshold 560 may be insufficient, and the image processing system may require that a characteristic score exceed the image processing system. In such examples, the image processing system can determine that it will output, as its output image, the zoomed image at the second zoom strength 520 of 2× based on the second characteristic score 525 ("high") meeting or exceeding the predetermined characteristic threshold 560 ("medium").

Figure 6:
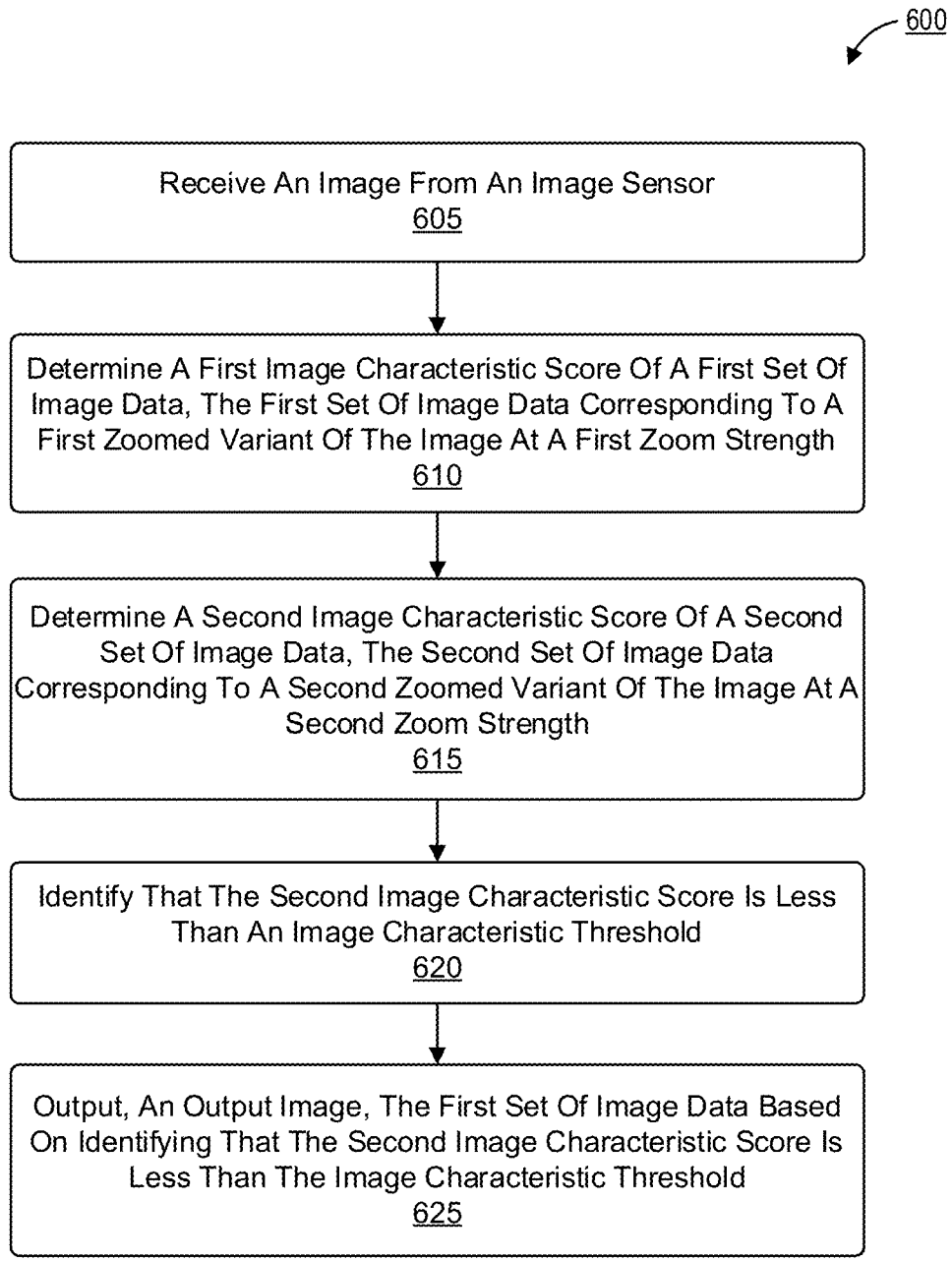
FIG. 6 is a flow diagram illustrating operations for processing image data.

FIG. 6 is a flow diagram 600 illustrating operations for processing image data. In some examples, the operations of the image processing technique illustrated in the flow diagram 600 may be performed by an image processing system. In some examples, the image processing system is the image processing system 200. In some examples, the classification system includes at least one of an image capture and processing system 100, an image capture device 105A, an image processing device 105B, an image processor 150, an ISP 154, a host processor 152, an image processing system 200, an image sensor 205, an ISP 210, a post-processing engine 215, a selection interface 230, an image characteristic evaluation engine 235, a media encoder 240, a selection interface associated with FIGS. 3A-3B, an image processing system associated with FIGS. 4A-4C, a trained ML model, a trained NN, one or more network servers of a cloud service, a computing system 700, or a combination thereof.

At operation 605, the image processing system receives an image from an image sensor. The image can be captured by the image sensor of the image processing system. Examples of the image sensor of operation 605 include the image sensor 130 of FIG. 1 and the image sensor 205 of FIG. 2. In some examples, the image is at least partially processed (e.g., by the ISP 154 and/or the ISP 210) before the image processing system receives the image. In some examples, the image processing system may include a connector coupled to the image sensor, and the image may be received using the connector. The connector may include a port, a jack, a wire, an input/output (IO) pin, a conductive trace on a printed circuit board (PCB), any other type of connector discussed herein, or some combination thereof. In some examples, the image processing system may include the image sensor that captures the image.

At operation 610, the image processing system determines a first image characteristic score of a first set of image data. The first set of image data corresponding to a first zoomed variant of the image at a first zoom strength. In some examples, the image processing system generates the first zoomed variant of the image at least in part by cropping and upscaling the image according to the first zoom strength. The first digitally zoomed portion 420 of the image 410 of FIG. 4B is an example of the first zoomed variant of the image at a first zoom strength (and/or the first set of image data).

At operation 615, the image processing system determines a second image characteristic score of a second set of image data. The second set of image data corresponding to a second zoomed variant of the image at a second zoom strength. In some examples, the image processing system generates the second zoomed variant of the image at least in part by cropping and upscaling at least one of the image and the first zoomed variant of the image according to the second zoom strength. The second digitally zoomed portion 430 of the image 410 of FIG. 4C is an example of the second zoomed variant of the image at the first zoom strength (and/or the second set of image data).

In some examples, the first set of image data corresponds to a first digitally zoomed portion of the image at the first zoom strength. The first digitally zoomed portion 420 of the image 410 of FIG. 4B is an example of the first digitally zoomed portion of the image at the first zoom strength (and/or the first set of image data). In some examples, the second set of image data corresponds to a second digitally zoomed portion of the image at the second zoom strength. The second digitally zoomed portion 430 of the image 410 of FIG. 4C is an example of the second digitally zoomed portion of the image at the first zoom strength (and/or the second set of image data). In some examples, the second digitally zoomed portion of the image is a subset of the first digitally zoomed portion of the image. For instance, the second digitally zoomed portion 430 of FIG. 4C is a subset of the first digitally zoomed portion 420 of the image 410 of FIG. 4B. In some examples, the first digitally zoomed portion of the image is different from the second digitally zoomed portion of the image. For instance, the second digitally zoomed portion 430 of FIG. 4C is different from the first digitally zoomed portion 420 of the image 410 of FIG. 4B.

In some examples, generating the first digitally zoomed portion of the image at the first zoom strength may include cropping the image. In some examples, generating the second digitally zoomed portion of the image at the second zoom strength may include cropping the image or the first digitally zoomed portion of the image. In some examples, generating the first digitally zoomed portion of the image at the first zoom strength may include upscaling and/or upsampling the image. In some examples, generating the second digitally zoomed portion of the image at the second zoom strength may include upscaling and/or upsampling the first digitally zoomed portion of the image.

In some examples, the image sensor may be a high-resolution image sensor. The image may be pixel-binned as received from the image sensor in operation 605. In pixel-binning, values (e.g., charge values) for one or more adjacent pixels (e.g., a square of 4 pixels) may be averaged or summed, and may be reported as a single super-pixel. Pixel-binning may reduce noise. In some examples, rather than upscaling and/or upsampling the image to generate the first digitally zoomed portion of the image and/or the second digitally zoomed portion of the image, the image processing system may disable binning, and may use original pixel values from the image sensor for the zoomed image(s) rather than super-pixels. In some examples, rather than upscaling and/or upsampling the image to generate the first digitally zoomed portion of the image and/or the second digitally zoomed portion of the image, the image processing system may reduce binning by combining fewer original pixels for each super-pixel, and may the reduced-binning super pixel values for the zoomed image(s).

At operation 620, the image processing system identifies that the second image characteristic score is less than an image characteristic threshold. In some examples, the image processing system also identifies that the first image characteristic score (of operation 610) is greater than or equal to the image characteristic threshold.

In some examples, the first image characteristic score is a first image sharpness score, the second image characteristic score is a second image sharpness score, and the image characteristic threshold is an image sharpness threshold. In some examples, the first image characteristic score is a first under-sharpening value of the first set of image data, the second image characteristic score is a second under-sharpening value of the second set of image data, and the image characteristic threshold is an under-sharpening value threshold.

In an illustrative example, the image characteristic threshold of operation 615 may be the image characteristic threshold 560 of FIG. 5. The second image characteristic score of operation 615 and operation 620 may be the image characteristic score 545 (Low) or the image characteristic score 555 (Very Low) of FIG. 5. The second zoomed variant of the image at the second zoom strength may therefore be a zoomed variant of an image at zoom strength 540 (8×) or at zoom strength 550 (16×) of FIG. 5. The first image characteristic score of operation 610 may be the image characteristic score 515 (Very High), the image characteristic score 525 (High), or the image characteristic score 535 (Medium) of FIG. 5. The first zoomed variant of the image at the first zoom strength may therefore be a zoomed variant of an image at zoom strength 510 (1×), at zoom strength 520 (2×), or at zoom strength 530 (4×) of FIG. 5.

At operation 625, the image processing system outputs, as an output image, the first set of image data based on identifying that the second image characteristic score is less than the image characteristic threshold. In some examples, outputting the first set of image data as the output image is also based on the first image characteristic score being greater than or equal to the image characteristic threshold.

In some examples, the first set of image data and/or the output image and/or the first zoomed variant of the image at the first zoom strength may a zoomed variant of an image at zoom strength 510 (1×), at zoom strength 520 (2×), or at zoom strength 530 (4×) of FIG. 5. In an illustrative example, the first set of image data and/or the output image and/or the first zoomed variant of the image at the first zoom strength may be a zoomed variant of an image at zoom strength 530 (4×) of FIG. 5, since the zoom strength 530 (4×) is the highest possible zoom strength for which the corresponding image characteristic score (the image characteristic score 535 of "Medium") is not less than the image characteristic threshold 560 ("Medium") of FIG. 5.

In some examples, to output the first set of image data as the output image, the image processing system is configured to, and can, render the output image for display on a display screen. In some examples, to output the first set of image data as the output image, the image processing system is configured to, and can, display the output image on the display screen. The image processing system can include the display screen. Examples of the display screen may include the I/O 156, the I/O 160, the display screen 225 the output device 735, or a combination thereof. In some examples, to output the first set of image data as the output image, the image processing system is configured to, and can, encode the output image for display on a display screen. Encoding and/or rendering of the output image may be performed, in some examples, by the host processor 152, the image processor 150, the post-processing engine 215, the camera preview engine 220, the media encoder 240, the output device 735, or a combination thereof.

In some examples, to output the first set of image data as the output image, the one or more processors are configured to transmit the output image using a communication interface. The image processing system may include the communication interface, which may be configured to, and may, transmit the output image to a device. Examples of the communication interface may include the I/O 156, the I/O 160, the output device 735, the communication interface 740, or a combination thereof.

In some examples, the image processing system also receives one or more inputs identifying a portion of the image, wherein the first zoomed variant of the image and the second zoomed variant of the image are based on the identified portion of the image. Examples of the identified portion of the image include the identified portion 330 of the image 310 of FIG. 3A, the digitally zoomed portion 320 of the image 310 of FIG. 3A, the identified portion 350 of the image 310 of FIG. 3B, the digitally zoomed portion 340 of the image 310 of FIG. 3B, the identified portion 450 of the image 410 of FIGS. 4A-4C, the first digitally zoomed portion 420 of the image 410 of FIG. 4B, the second digitally zoomed portion 430 of the image 410 of FIG. 4C, or a combination thereof.

In some examples, the first zoomed variant of the image and the second zoomed variant of the image include the identified portion of the image. In some examples, the one or more inputs include a user input through a user interface. In some examples, the user input and/or the one or more inputs include at least one of a touch input, a hover input, a gesture input, a gaze input, a button press, a pointer movement, a pointer click, or a combination thereof. Examples of the user input and/or the one or more inputs include the touch input 335 of FIG. 3A. In some examples, the image processing system receives the one or more inputs from an object detection algorithm, the object detection algorithm determining that the identified portion of the image includes a depiction of a type of object. In some examples, the type of object is a face. Examples of the object detection algorithm include the facial detection algorithm 355 of FIG. 3B. The object detection algorithm may be a facial detection algorithm, a facial recognition algorithm, a facial tracking algorithm, an object detection algorithm, an object recognition algorithm, an object tracking algorithm, a feature detection algorithm, a feature recognition algorithm, a feature tracking algorithm, a semantic analysis algorithm, or a combination thereof.

In some examples, the image processing system can receive a first sensor readout corresponding to a first portion of a scene. The image processing system can evaluate the readout. The image processing system can receive a second sensor readout corresponding to a second portion of the scene at a different zoom strength, The image processing system can select, and output as an output image, one of the first sensor readout or the second sensor readout. In some examples, the image processing system can determine a first image characteristic score for the first sensor readout and a second image characteristic score for the second sensor readout. The image processing system can select the first sensor readout as the output image, for example, based on determining that the first image characteristic score is higher than the second image characteristic score. The image processing system can select the first sensor readout as the output image, for example, based on determining that the first image characteristic score is higher than an image characteristic threshold and/or that the second image characteristic score is lower than the image characteristic threshold.

The image processing technique illustrated in the flow diagram 600 may also include any operation discussed illustrated in, or discussed with respect to, any of the conceptual diagrams, block diagrams, and flow diagrams 100, 200, 300, 500, and/or 700.

In some cases, at least a subset of the techniques illustrated by the any of the conceptual diagrams, block diagrams, and flow diagrams 100, 200, 300, 500, and/or 700 may be performed remotely by one or more network servers of a cloud service. In some examples, the processes described herein (e.g., processes including those illustrated by the conceptual diagrams, block diagrams, and flow diagrams 200, 300, 500, 600, 1000, 1100, 1200, 600, and/or other processes described herein) may be performed by a computing system or apparatus. In some examples, the processes illustrated by the conceptual diagrams, block diagrams, and flow diagrams 100, 200, 300, 500, and/or 700 can be performed by the image capture device 105A of FIG. 1, the image processing device 105B of FIG. 1, and/or the image capture and processing system 100 of FIG. 1. In some examples, the processes illustrated by the conceptual diagrams, block diagrams, and flow diagrams 100, 200, 300, 500, and/or 700 can be performed by the image processing system 200 of FIG. 2. In some examples, the processes illustrated by the conceptual diagrams, block diagrams, and flow diagrams 100, 200, 300, 500, and/or 700 can be performed by a computing system with the architecture of the computing system 700 shown in FIG. 7. The computing system can include any suitable device, such as a mobile device (e.g., a mobile phone), a desktop computing device, a tablet computing device, a wearable device (e.g., a VR headset, an AR headset, AR glasses, a network-connected watch or smartwatch, or other wearable device), a server computer, an autonomous vehicle or computing device of an autonomous vehicle, a robotic device, a television, and/or any other computing device with the resource capabilities to perform the processes described herein, including the processes illustrated by the conceptual diagrams, block diagrams, and flow diagrams 100, 200, 300, 500, and/or 700. In some cases, the computing system or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing system may include a display, a network interface configured to communicate and/or receive the data, any combination thereof, and/or other component(s). The network interface may be configured to communicate and/or receive Internet Protocol (IP) based data or other type of data.

The components of the computing system can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The processes illustrated by conceptual diagrams, block diagrams, and flow diagrams 100, 200, 300, 500, and/or 700 are organized as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes illustrated by conceptual diagrams, block diagrams, and flow diagrams 100, 200, 300, 500, 700, and/or other processes described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 7:
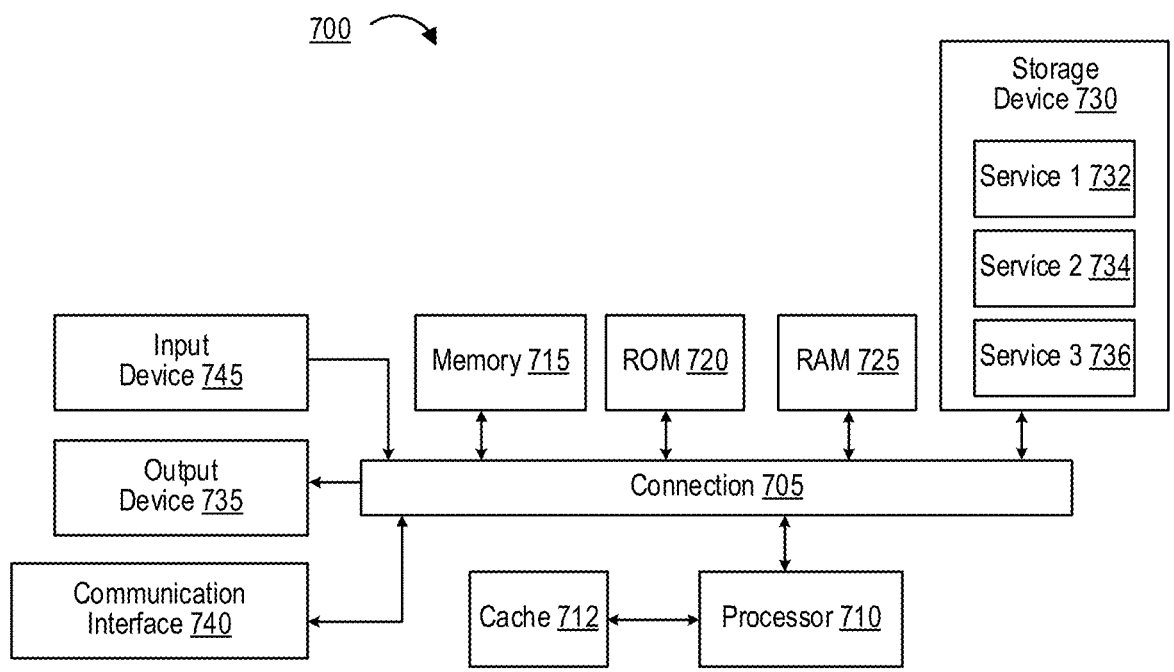
FIG. 7 is a diagram illustrating an example of a system for implementing certain aspects of the present technology.

FIG. 7 is a diagram illustrating an example of a system for implementing certain aspects of the present technology. In particular, FIG. 7 illustrates an example of computing system 700, which can be for example any computing device or computing system making up the image capture and processing system 100, the image capture device 105A, the image processing device 105B, the image processor 150, the host processor 152, the ISP 154, the image processing system 200, the image sensor 205, the ISP 210, the post-processing engine 215, the selection interface 230, the image characteristic evaluation engine 235, the media encoder 240, the selection interface associated with FIGS. 3A-3B, the image processing system associated with FIGS. 4A-4C, one or more trained ML models, one or more trained NNs, one or more network servers, a camera, any combination thereof, or any component thereof in which the components of the system are in communication with each other using connection 705. Connection 705 can be a physical connection using a bus, or a direct connection into processor 710, such as in a chipset architecture. Connection 705 can also be a virtual connection, networked connection, or logical connection.

In some embodiments, computing system 700 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 700 includes at least one processing unit (CPU or processor) 710 and connection 705 that couples various system components including system memory 715, such as read-only memory (ROM) 720 and random access memory (RAM) 725 to processor 710. Computing system 700 can include a cache 712 of high-speed memory connected directly with, in close proximity to, or integrated as part of processor 710.

Processor 710 can include any general purpose processor and a hardware service or software service, such as services 732, 734, and 736 stored in storage device 730, configured to control processor 710 as well as a special-purpose processor where software instructions are incorporated into the actual processor design. Processor 710 may essentially be a completely self-contained computing system, containing multiple cores or processors, a bus, memory controller, cache, etc. A multi-core processor may be symmetric or asymmetric.

To enable user interaction, computing system 700 includes an input device 745, which can represent any number of input mechanisms, such as a microphone for speech, a touch-sensitive screen for gesture or graphical input, keyboard, mouse, motion input, speech, etc. Computing system 700 can also include output device 735, which can be one or more of a number of output mechanisms. In some instances, multimodal systems can enable a user to provide multiple types of input/output to communicate with computing system 700. Computing system 700 can include communications interface 740, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 740 may also include one or more Global Navigation Satellite System (GNSS) receivers or transceivers that are used to determine a location of the computing system 700 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 730 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L#), resistive random-access memory (RRAM/ReRAM), phase change memory (PCM), spin transfer torque RAM (STT-RAM), another memory chip or cartridge, and/or a combination thereof.

The storage device 730 can include software services, servers, services, etc., that when the code that defines such software is executed by the processor 710, it causes the system to perform a function. In some embodiments, a hardware service that performs a particular function can include the software component stored in a computer-readable medium in connection with the necessary hardware components, such as processor 710, connection 705, output device 735, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Illustrative aspects of the disclosure include:

Aspect 1: An apparatus for processing image data, the apparatus comprising: a memory; and one or more processors coupled to the memory, the one or more processors configured to: receive an image from an image sensor; determine a first image characteristic score of a first set of image data, the first set of image data corresponding to a first zoomed variant of the image at a first zoom strength; determine a second image characteristic score of a second set of image data, the second set of image data corresponding to a second zoomed variant of the image at a second zoom strength; identify that the second image characteristic score is less than an image characteristic threshold; and output, as an output image, the first set of image data based on identifying that the second image characteristic score is less than the image characteristic threshold.

Aspect 2: The apparatus of Aspect 1, wherein outputting the first set of image data as the output image is also based on the first image characteristic score being greater than or equal to the image characteristic threshold.

Aspect 3: The apparatus of any of Aspects 1 to 2, wherein the first image characteristic score is a first image sharpness score, the second image characteristic score is a second image sharpness score, and the image characteristic threshold is an image sharpness threshold.

Aspect 4: The apparatus of any of Aspects 1 to 3, wherein the first image characteristic score is a first under-sharpening value of the first set of image data, the second image characteristic score is a second under-sharpening value of the second set of image data, and the image characteristic threshold is an under-sharpening value threshold.

Aspect 5: The apparatus of any of Aspects 1 to 4, wherein the one or more processors are configured to: receive one or more inputs identifying a portion of the image, wherein the first zoomed variant of the image and the second zoomed variant of the image are based on the identified portion of the image.

Aspect 6: The apparatus of Aspect 5, wherein the first zoomed variant of the image and the second zoomed variant of the image include the identified portion of the image.

Aspect 7: The apparatus of any of Aspects 5 or 6, wherein the one or more inputs include a user input through a user interface.

Aspect 8: The apparatus of any of Aspects 5 to 7, wherein the one or more inputs include at least one of a touch input, a gesture input, and a gaze input.

Aspect 9: The apparatus of any of Aspects 5 to 8, wherein the one or more processors are configured to receive the one or more inputs from an object detection algorithm, the object detection algorithm determining that the identified portion of the image includes a depiction of a type of object.

Aspect 10: The apparatus of Aspect 9, wherein the type of object is a face.

Aspect 11: The apparatus of any of Aspects 1 to 10, wherein the one or more processors are configured to: generate the first zoomed variant of the image at least in part by cropping and upscaling the image according to the first zoom strength; and generate the second zoomed variant of the image at least in part by cropping and upscaling at least one of the image and the first zoomed variant of the image according to the second zoom strength.

Aspect 12: The apparatus of any of Aspects 1 to 11, wherein, to output the first set of image data as the output image, the one or more processors are configured to render the output image for display on a display screen.

Aspect 13: The apparatus of any of Aspects 1 to 12, further comprising: a display screen configured to display the output image.

Aspect 14: The apparatus of any of Aspects 1 to 13, wherein the one or more processors are configured to: identify that a difference between the first image characteristic score and the second image characteristic score is less than a difference threshold; and output, as a second output image, the second set of image data based on the difference being less than the difference threshold.

Aspect 15: The apparatus of any of Aspects 1 to 14, wherein the first set of image data corresponds to a first digitally zoomed portion of the image at the first zoom strength and the second set of image data corresponds to a second digitally zoomed portion of the image at the second zoom strength.

Aspect 16: The apparatus of Aspect 15, wherein the second digitally zoomed portion of the image is a subset of the first digitally zoomed portion of the image.

Aspect 17: The apparatus of Aspect 15, wherein the first digitally zoomed portion of the image is different from the second digitally zoomed portion of the image.

Aspect 18: The apparatus of any of Aspects 1 to 17, wherein, to output the first set of image data as the output image, the one or more processors are configured to transmit the output image using a communication interface.

Aspect 19: The apparatus of any of Aspects 1 to 18, further comprising: a communication interface configured to transmit the output image to a device.

Aspect 20: The apparatus of any of Aspects 1 to 19, wherein the apparatus is one of a mobile device, a mobile handset, a wireless communication device, a head-mounted display, and a camera.

Aspect 21: The apparatus of any of Aspects 1 to 20, further comprising: the image sensor configured to capture the image.

Aspect 22: A method of processing image data, the method comprising: receiving an image from an image sensor; determining a first image characteristic score of a first set of image data, the first set of image data corresponding to a first zoomed variant of the image at a first zoom strength; determining a second image characteristic score of a second set of image data, the second set of image data corresponding to a second zoomed variant of the image at a second zoom strength; identifying that the second image characteristic score is less than an image characteristic threshold; and outputting, as an output image, the first set of image data based on identifying that the second image characteristic score is less than the image characteristic threshold.

Aspect 23: The method of Aspect 22, wherein outputting the first set of image data as the output image is also based on the first image characteristic score being greater than or equal to the image characteristic threshold.

Aspect 24: The method of any of Aspects 22 to 23, wherein the first image characteristic score is a first image sharpness score, the second image characteristic score is a second image sharpness score, and the image characteristic threshold is an image sharpness threshold.

Aspect 25: The method of any of Aspects 22 to 24, wherein the first image characteristic score is a first under-sharpening value of the first set of image data, the second image characteristic score is a second under-sharpening value of the second set of image data, and the image characteristic threshold is an under-sharpening value threshold.

Aspect 26: The method of any of Aspects 22 to 25, further comprising: receiving one or more inputs identifying a portion of the image, wherein the first zoomed variant of the image and the second zoomed variant of the image are based on the identified portion of the image.

Aspect 27: The method of Aspect 26, wherein the first zoomed variant of the image and the second zoomed variant of the image include the identified portion of the image.

Aspect 28: The method of any of Aspects 26 or 27, wherein the one or more inputs include a user input through a user interface.

Aspect 29: The method of any of Aspects 26 to 28, wherein the one or more inputs include at least one of a touch input, a gesture input, and a gaze input.

Aspect 30: The method of any of Aspects 26 to 29, further comprising: receiving the one or more inputs from an object detection algorithm, the object detection algorithm determining that the identified portion of the image includes a depiction of a type of object.

Aspect 31: The method of Aspect 30, wherein the type of object is a face.

Aspect 32: The method of any of Aspects 22 to 31, wherein the one or more processors are configured to: generating the first zoomed variant of the image at least in part by cropping and upscaling the image according to the first zoom strength; and generating the second zoomed variant of the image at least in part by cropping and upscaling at least one of the image and the first zoomed variant of the image according to the second zoom strength.

Aspect 33: The method of any of Aspects 22 to 32, wherein outputting the first set of image data as the output image includes rendering the output image for display on a display screen.

Aspect 34: The method of any of Aspects 22 to 33, wherein the one or more processors are configured to: identify that a difference between the first image characteristic score and the second image characteristic score is less than a difference threshold; and output, as a second output image, the second set of image data based on the difference being less than the difference threshold.

Aspect 35: The method of any of Aspects 22 to 34, wherein the first set of image data corresponds to a first digitally zoomed portion of the image at the first zoom strength and the second set of image data corresponds to a second digitally zoomed portion of the image at the second zoom strength.

Aspect 36: The method of Aspect 35, wherein the second digitally zoomed portion of the image is a subset of the first digitally zoomed portion of the image.

Aspect 37: The method of Aspect 35, wherein the first digitally zoomed portion of the image is different from the second digitally zoomed portion of the image.

Aspect 38: The method of any of Aspects 22 to 37, wherein outputting the first set of image data as the output image includes transmitting the output image using a communication interface.

Aspect 39: A non-transitory computer-readable medium that has stored thereon instructions that, when executed by one or more processors, cause the one or more processors to perform operations according to any of 2 to 38.

Aspect 40: An apparatus for image processing, apparatus comprising means for performing operations according to any of Aspects 2 to 38.

What is claimed is:

1. An apparatus for processing image data, the apparatus comprising:
   a memory; and
   one or more processors coupled to the memory, the one or more processors configured to:
      receive an image from an image sensor;
      determine a first image characteristic score of a first set of image data, the first set of image data corresponding to a first zoomed variant of the image at a first zoom strength;
      determine a second image characteristic score of a second set of image data, the second set of image data corresponding to a second zoomed variant of the image at a second zoom strength;
      identify that the second image characteristic score is less than an image characteristic threshold; and output, as an output image, the first set of image data based on identifying that the second image characteristic score is less than the image characteristic threshold.

2. The apparatus of claim 1, wherein outputting the first set of image data as the output image is also based on the first image characteristic score being greater than or equal to the image characteristic threshold.

3. The apparatus of claim 1, wherein the first image characteristic score is a first image sharpness score, the second image characteristic score is a second image sharpness score, and the image characteristic threshold is an image sharpness threshold.

4. The apparatus of claim 1, wherein the first image characteristic score is a first under-sharpening value of the first set of image data, the second image characteristic score is a second under-sharpening value of the second set of image data, and the image characteristic threshold is an under-sharpening value threshold.

5. The apparatus of claim 1, wherein the one or more processors are configured to:
generate the first zoomed variant of the image at least in part by cropping and upscaling the image according to the first zoom strength; and
generate the second zoomed variant of the image at least in part by cropping and upscaling at least one of the image and the first zoomed variant of the image according to the second zoom strength.

6. The apparatus of claim 1, wherein the one or more processors are configured to:
identify that a difference between the first image characteristic score and the second image characteristic score is less than a difference threshold; and
output, as a second output image, the second set of image data based on the difference being less than the difference threshold.

7. The apparatus of claim 1, wherein the apparatus is one of a mobile device, a mobile handset, a wireless communication device, a head-mounted display, and a camera.

8. The apparatus of claim 1, further comprising:
the image sensor configured to capture the image.

9. The apparatus of claim 1, wherein, to output the first set of image data as the output image, the one or more processors are configured to render the output image for display on a display screen.

10. The apparatus of claim 9, further comprising:
the display screen configured to display the output image.

11. The apparatus of claim 1, wherein, to output the first set of image data as the output image, the one or more processors are configured to transmit the output image using a communication interface.

12. The apparatus of claim 11, further comprising:
the communication interface configured to transmit the output image to a device.

13. The apparatus of claim 1, wherein the first set of image data corresponds to a first digitally zoomed portion of the image at the first zoom strength and the second set of image data corresponds to a second digitally zoomed portion of the image at the second zoom strength.

14. The apparatus of claim 13, wherein the second digitally zoomed portion of the image is a subset of the first digitally zoomed portion of the image.

15. The apparatus of claim 13, wherein the first digitally zoomed portion of the image is different from the second digitally zoomed portion of the image.

16. The apparatus of claim 1, wherein the one or more processors are configured to:
receive one or more inputs identifying a portion of the image, wherein the first zoomed variant of the image and the second zoomed variant of the image are based on the identified portion of the image.

17. The apparatus of claim 16, wherein the first zoomed variant of the image and the second zoomed variant of the image include the identified portion of the image.

18. The apparatus of claim 16, wherein the one or more inputs include a user input through a user interface.

19. The apparatus of claim 18, wherein the one or more inputs include at least one of a touch input, a gesture input, and a gaze input.

20. The apparatus of claim 16, wherein the one or more processors are configured to receive the one or more inputs from an object detection algorithm, the object detection algorithm determining that the identified portion of the image includes a depiction of a type of object.

21. The apparatus of claim 20, wherein the type of object is a face.

22. A method of processing image data, the method comprising:
receiving an image from an image sensor;
determining a first image characteristic score of a first set of image data, the first set of image data corresponding to a first zoomed variant of the image at a first zoom strength;
determining a second image characteristic score of a second set of image data, the second set of image data corresponding to a second zoomed variant of the image at a second zoom strength;
identifying that the second image characteristic score is less than an image characteristic threshold; and
outputting, as an output image, the first set of image data based on identifying that the second image characteristic score is less than the image characteristic threshold.

23. The method of claim 22, wherein outputting the first set of image data as the output image is also based on the first image characteristic score being greater than or equal to the image characteristic threshold.

24. The method of claim 22, wherein the first image characteristic score is a first image sharpness score, the second image characteristic score is a second image sharpness score, and the image characteristic threshold is an image sharpness threshold.

25. The method of claim 22, wherein the first image characteristic score is a first under-sharpening value of the first set of image data, the second image characteristic score is a second under-sharpening value of the second set of image data, and the image characteristic threshold is an under-sharpening value threshold.

26. The method of claim 22, further comprising:
generating the first zoomed variant of the image at least in part by cropping and upscaling the image according to the first zoom strength; and
generating the second zoomed variant of the image at least in part by cropping and upscaling at least one of the image and the first zoomed variant of the image according to the second zoom strength.

27. The method of claim 22, wherein outputting the first set of image data as the output image includes rendering the output image for display on a display screen.

28. The method of claim 22, wherein outputting the first set of image data as the output image includes transmitting the output image using a communication interface.

29. The method of claim 22, further comprising:
receiving one or more inputs identifying a portion of the image, wherein the first zoomed variant of the image and the second zoomed variant of the image are based on the identified portion of the image.

30. The method of claim 29, wherein the first zoomed variant of the image and the second zoomed variant of the image include the identified portion of the image.

\* \* \* \* \*